(12) United States Patent
Rebbeck et al.

(10) Patent No.: US 10,040,568 B2
(45) Date of Patent: Aug. 7, 2018

(54) ELECTRICAL PROTECTOR

(71) Applicant: SHORT BROTHERS PLC, Belfast (GB)

(72) Inventors: Lynsey Rebbeck, Holywood (GB); Paolo Ballocchi, Dundrum (GB); Peter Quigley, Bangor (GB); Sam Wilson, Belfast (GB)

(73) Assignee: SHORT BROTHERS PLC, Belfast (GB)

( * ) Notice: Subject to any disclaimer, the term of this patent is extended or adjusted under 35 U.S.C. 154(b) by 435 days.

(21) Appl. No.: 14/762,083

(22) PCT Filed: Jan. 27, 2014

(86) PCT No.: PCT/EP2014/051491
§ 371 (c)(1),
(2) Date: Jul. 20, 2015

(87) PCT Pub. No.: WO2014/118117
PCT Pub. Date: Aug. 7, 2014

(65) Prior Publication Data
US 2015/0367954 A1    Dec. 24, 2015

Related U.S. Application Data

(60) Provisional application No. 61/758,477, filed on Jan. 30, 2013.

(51) Int. Cl.
*F16B 37/14* (2006.01)
*B64D 37/32* (2006.01)
(Continued)

(52) U.S. Cl.
CPC ............. *B64D 37/32* (2013.01); *B64D 45/02* (2013.01); *F16B 37/14* (2013.01); *F16B 11/006* (2013.01);
(Continued)

(58) Field of Classification Search
CPC ......... B64D 45/02; F16B 33/004; F16B 37/14
(Continued)

(56) References Cited

U.S. PATENT DOCUMENTS 4,235,147 A    11/1980  Weidner, Jr.
4,392,049 A    5/1983   Hofmeister et al.
(Continued)

FOREIGN PATENT DOCUMENTS

CN    101079209 A    11/2007
CN    101450728 A    6/2009
(Continued)

OTHER PUBLICATIONS

WO-2012/147645, entire specification and drawings.*
(Continued)

*Primary Examiner* — Dharti Patel
(74) *Attorney, Agent, or Firm* — Karceski IP Law, PLLC

(57) ABSTRACT

An electrical protector with a central axis includes a cap defining a top and a downwardly extending cap wall, and insert defining a ring and an upwardly extending insert wall, at least three protrusions extending inwardly from an interior surface of the insert wall toward the central axis, and a sealant disposed at least within the cap. The cap wall engages the insert wall, thereby establishing a connection between the cap and the insert. The protrusions are adapted to engage a structure, thereby securing the electrical protector onto the structure.

26 Claims, 17 Drawing Sheets

(51) Int. Cl.
*B64D 45/02* (2006.01)
*F16B 11/00* (2006.01)
*F16B 33/00* (2006.01)

(52) U.S. Cl.
CPC ....... *F16B 33/004* (2013.01); *Y10T 29/49229* (2015.01)

(58) Field of Classification Search
USPC .......................................................... 361/218
See application file for complete search history.

(56) References Cited

U.S. PATENT DOCUMENTS

| | | | |
|---|---|---|---|
| 4,826,380 | A | 5/1989 | Henry |
| 4,905,931 | A | 3/1990 | Covey |
| 5,082,409 | A | 1/1992 | Bias |
| 5,707,113 | A | 1/1998 | Russell |
| 7,342,765 | B2 | 3/2008 | Orgaz Villegas et al. |
| 7,800,884 | B2 * | 9/2010 | Martin Hernandez ............................ B64D 45/02 361/218 |
| 8,003,014 | B2 | 8/2011 | Breay et al. |
| 2011/0226896 | A1 | 9/2011 | Bessho et al. |
| 2012/0074257 | A1 | 3/2012 | Bessho et al. |
| 2012/0219380 | A1 * | 8/2012 | Hutter, III ............. B64D 45/02 411/377 |

FOREIGN PATENT DOCUMENTS

| | | |
|---|---|---|
| FR | 2825427 | 12/2002 |
| WO | WO 9729289 | 8/1997 |
| WO | WO 0057069 | 9/2000 |
| WO | WO 2012118855 A2 | 9/2012 |
| WO | WO 2012147645 A1 | 11/2012 |

OTHER PUBLICATIONS

JP-4235147, entire specification and drawings.*
Chinese Office Action dated Feb. 4, 2017, for Chinese Patent Application No. 201480006769.2.
Chinese Office Action dated Mar. 15, 2016, for Chinese Patent Appiication No. 201480006769.2.
Chinese Office Action dated Jul. 19, 2017, for Chinese Patent Application No. 201480006769.2.
Chinese Office Action dated Sep. 18, 2016, for Chinese Patent Application No. 201480006769.2
International Search Report dated Apr. 15, 2014, for International Patent Application No. PCT/EP2014/051491.

* cited by examiner

ELECTRICAL PROTECTOR

CROSS-REFERENCE TO RELATED APPLICATION(S)

This is a National Stage Entry into the United States Patent and Trademark Office from International PCT Patent Application No. PCT/EP2014/051491, having an international filing date of Jan. 27, 2014, and which claims priority to U.S. Provisional Patent Application No. 61/758,477, filed Jan. 30, 2013, the entire contents of both of which are incorporated herein by reference.

FIELD OF THE INVENTION

The present invention concerns a device that is applied to a nut, bolt, or other protruding structure to insulate the structure. In particular, the present invention concerns the design of a structure that establishes an electrical barrier between the protruding structure and its surrounding environment. More specifically, the present invention provides a device that insulates a nut, bolt, or other protruding structure from the surrounding environment in the event that there is a proximate lightning strike (i.e., Zone 2 protection).

DESCRIPTION OF THE RELATED ART

It is known to provide protection for nuts and bolts within the interior of an aircraft's fuel tank from lightning strikes on the aircraft.

As should be apparent to those skilled in the art, if an aircraft is struck by lightning, it is possible that a portion of the energy from the lightning may travel to a nut or bolt within the fuel tank on the aircraft. While remote, the energy from the lightning might initiate a spark that could ignite the fuel in the fuel tank.

To prevent the occurrence of such an event, however remote the occurrence might be, it is customary for aircraft manufacturers to cover any protruding nuts and/or bolts with a sealant that isolates the nut or bolt from the environment within the fuel tank.

One known method of sealing protruding structures is to coat the structures with a suitable sealant.

Another method involves creating a cup from the sealant by allowing a thin layer of the sealant to cure. The remaining volume of the cup is then filled with additional sealant before being applied to the protruding structure in the fuel tank of the aircraft.

U.S. Pat. No. 4,382,049 (hereinafter "the '049 Patent") describes a lightning spark isolation barrier that includes a fastener 10 that is attached to a surface 12 via rivets 20. (The '049 Patent at col. 3, lines 1-2.) The fastener 10 is located on the inner surface of an exterior skin of an aircraft in a critical fuel vapor area. (The '049 Patent at col. 3, lines 2-4.) The fastener 10 is partially surrounded by a cap 22 that is first filled with a dielectric isolation material 24 in an uncured, viscous, or plastic form. (The '049 Patent at col. 3, lines 5-14.) The cap 22 is made of plastic. (The '049 Patent at col. 3, lines 14-16.)

U.S. Pat. No. 4,905,931 (hereinafter "the '931 Patent") describes an arc suppression apparatus that is positioned around a fastener. The fastener 10 attaches two composite members 20, 22 together. (The '931 Patent at col. 2, lines 33-34.) The '931 Patent describes a plastic cap 50 that is affixed to the composite member 22 at the surface 19 and is placed over the end of the fastener to enclose a volume of air gases 41 in the void 40. (The '931 Patent at col. 3, lines 15-20.) A polysulfide rubber sealant 50 is provided outside of and around the cap 50 to ensure that an airtight seal around the void 40 exists at all times during the lifetime of the aircraft. (The '931 Patent at col. 3, lines 20-24.)

U.S. Patent Application Publication No. 2012/0074257 (hereinafter "the '257 Application") describes a lightning-resistant fastener, cap, and method of mounting the lightning-resistant fastener. The '257 Application describes that a collar 26 is screwed onto a fastener main body 25. (The '257 Application at paragraph [0040].) The collar 26 and screw 25 are encased beneath a cap 30 made from an insulating resin. (The '257 Application at paragraph [0046].) The cap 30 is filled with a sealant 34. (The '257 Application at paragraph [0052].) The cap 30 may be pre-filled with the sealant 34 in an uncured state. (The '257 Application at paragraph [0053].)

While these methods are effective, there remains a desire for a simple, cost effective lightning strike protector.

SUMMARY OF THE INVENTION

The present invention addresses one or more of the deficiencies noted with respect to the prior art.

In particular, the present invention, provides an electrical protector with a central axis that includes a cap defining a top and a downwardly extending cap wall adapted for receiving a sealant, an insert defining a ring and an upwardly extending insert wall, and at least one protrusion extending inwardly from an interior surface of the insert wall toward the central axis. The cap wall connects to the insert wall. The at least one protrusion is adapted to engage a structure, thereby securing the lightning strike protector onto the structure.

According to one aspect of the present invention, the cap wall is frusto-conically shaped.

According to another aspect of the present invention, the insert wall is frusto-conically shaped.

In one embodiment of the present invention, the sealant is polysulfide.

It is contemplated that the cap wall and the insert wall may engage one another by an interference fit.

It is contemplated that the structure is at least one of a nut and a bolt. In addition, the structure may be located inside of a fuel tank of an aircraft.

The present invention provides for an electrical protector that may also include a plurality of castellations extending downwardly from the ring. In an alternative construction, the castellations may extend downwardly, through openings in the ring.

In another embodiment, it is contemplated that the insert will include multiple protrusions. If so, the protrusions may be substantially evenly distributed around the interior surface of the insert wall.

Similarly, it is contemplated that the castellations may be substantially evenly distributed around the ring or the cap.

It is contemplated that the cap and the insert may integrally form a single structure. Alternatively, the cap and the insert may be connected to one another via an adhesive.

In one embodiment, it is contemplated that the cap and the insert are made from a ceramic, a plastic, a thermoset plastic, or a polymer. It is also contemplated that the cap and insert may include glass fibers.

In one embodiment, the cap, the insert, and the sealant may have substantially equal dielectric properties. In alternative embodiments, the cap, the insert, and the sealant may have unequal dielectric properties.

It is contemplated that the electrical protector may include one or more twist discouraging tabs extending into the cap from a location proximate to a center point of the cap.

In another embodiment, the protrusion may be shaped as a finger-like element that extends inwardly from the insert wall. In other embodiments, the protrusion may be a triangularly-shaped element that extends inwardly from the insert wall. Separately, the protrusion may be a folded portion of the insert wall.

It is contemplated that the electrical protector of the present invention may protect against lightning strikes.

In one contemplated embodiment, three or more protrusions may extend inwardly from the insert wall.

The present invention also provides a method for positioning an electrical protector over a structure to be protected. As noted above, the electrical protector has a central axis and comprises a cap defining a top and a downwardly extending cap wall adapted for receiving a sealant. The electrical protector also includes an insert defining a ring and an upwardly extending insert wall and one or more protrusions extending inwardly from an interior surface of the insert wall toward the central axis. The cap wall connects to the insert wall. The protrusion is adapted to engage a structure, thereby securing the electrical protector onto the structure. The method includes the steps of introducing the sealant into the cap, affixing the cap and insert to the structure with the at least one protrusion in contact with the structure, and allowing the sealant to cure, thereby locking the at least one protrusion against the structure.

Still other aspects of the present invention will be made apparent from the discussion that follows.

BRIEF DESCRIPTION OF THE DRAWINGS

The present invention will now be described in connection with the drawings appended hereto, in which.

DETAILED DESCRIPTION OF EMBODIMENT(S) OF THE INVENTION

The present invention will now be described in connection with one or more embodiments. The discussion of any one particular embodiment or associated feature is not intended to be limiting of the present invention. To the contrary, the discussion of particular embodiments and features is intended to illustrate the breadth and scope of the present invention. There are numerous variations and equivalents that will be made apparent from the discussion that follows. Those variations and equivalents are intended to be encompassed by the scope of the present invention as if described herein.

With respect to various features that are discussed in connection with specific embodiments, it is noted that the features are not intended to be exclusive of one another. To the contrary, as should be apparent to those skilled in the art, several of the features may be combinable in arrangements that differ from the specific embodiments described below. Those combinations are contemplated to fall within the scope of the present invention.

It is noted that the present invention is described in connection with one or more embodiments of a lightning strike protector 10. With respect to lightning strike protection, it is noted that the present invention is intended for Zone 2 protection. As should be apparent to those skilled in the art, Zone 2 protection refers to a device that is not contemplated to be subject to a direct lightning strike.

While the present invention is discussed in connection with lighting strike protection, the present invention should not be understood to be limited thereto. It is contemplated that the protector 10 of the present invention may be employed in other, suitable environments. For example, it is contemplated that the protector 10 may be incorporated into components associated with the generation and transmission of electricity. For example, the protector may be employed within a high voltage transformer or the like.

Figure 1:
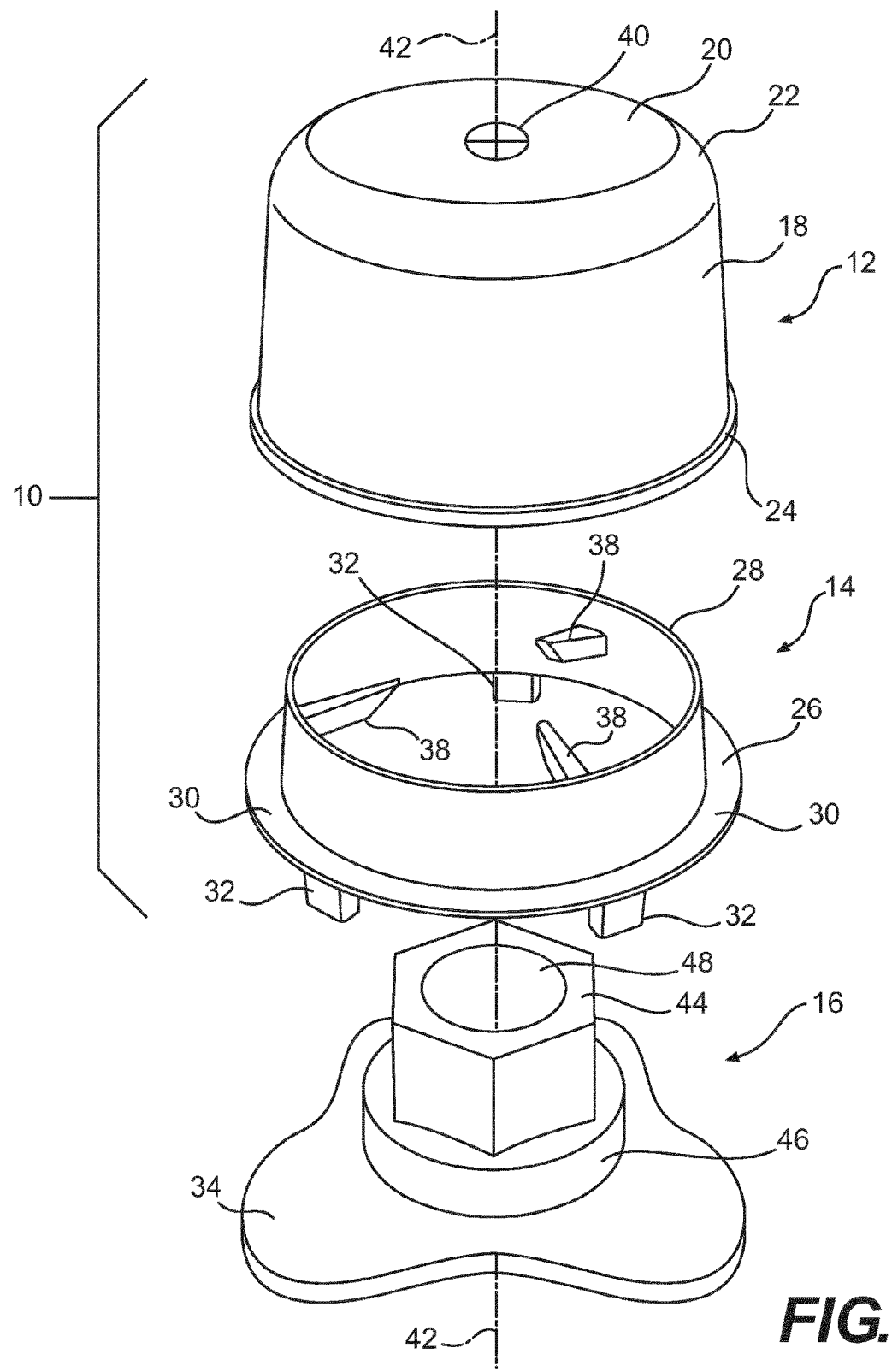
FIG. 1 is an exploded, perspective illustration of a first embodiment of the lightning strike protector according to the present invention.

FIG. 1 is a perspective illustration of a first contemplated embodiment of the lightning strike protector 10 according to the present invention. The lightning strike protector 10 includes a cap 12 and an insert 14. The cap 12 and insert 14 are contemplated to fit over a bolt 16 that is interior to the fuel tank of an aircraft.

While the present invention has been designed for installation in the fuel tank(s) of an aircraft, the present invention should not be understood to be limited to use in aircraft. To the contrary, it is contemplated that the lightning strike protector 10 may be employed in the fuel tanks of other vehicles including, but not limited to, locomotives, boats, ships, cars, etc.

In addition, while the present invention has been designed for installation in the fuel tanks for an aircraft, it is contemplated that the lightning strike protector 10 may be used outside of the context of a fuel tank without departing from the scope of the present invention.

In various ones of the figures that are discussed herein, a nut 16 also in shown. As a general definition for purposes of the instant discussion, the nut 16 may be any structure that protrudes into the interior of the fuel tank for the aircraft. While the lightning protector 10 of the present invention is intended to cover the nut 16, the nut 16 is not considered to be a part of the present invention. Moreover, as should be apparent, the present invention should not be understood to be limited to lightning strike protection only for nuts 16.

In addition, the nut 16 is illustrated as a hexagonal nut. As should be apparent, this is merely illustrative of one possible shape and configuration of the nut 16. The lightning strike protector 10 may be used with nuts 16 having different shapes without departing from the scope of the present invention.

Referring to FIG. 1, the cap 12 is contemplated to be an inverted, cup-shaped structure. As such, the cap 12 is contemplated to include a cylindrically-shaped wall 18 and a sealed, top end 20. In the illustrated embodiment, the cylindrically-shaped wall 18 connects to the top end 20 via a rounded transition region 22. The rounded transition region 22 is contemplated to provide a convenient transition between the wall 18 and the top 20 of the cap 12.

In the illustrated embodiment, the bottom edge of the wall 18 includes a lip 24, which is contemplated to provide the wall 18 with increased strength and rigidity. It is noted, however, that the lip 24 is not required to practice the present invention. To the contrary, the lip 24 may be omitted in its entirety without departing from the scope of the present invention.

It is contemplated that the cap 12 will be made from a plastic or thermoplastic material. While any particular material may be used, it is contemplated that materials that are easy to manufacture using injection molding techniques or thermoforming techniques encompass preferred materials. As should be apparent, however, the lightning strike protector 10 of the present invention is not intended to be limited to any particular material or construction technique.

With continued reference to FIG. 1, the other half of the lightning strike protector 10 is the insert 14. The insert 14 is essentially a ring 26 with an upwardly-extending wall 28. The ring 14 also is contemplated to be made from a plastic or thermoplastic material.

It is contemplated that the cup 12 and the ring 14 may be made from the same material. In an alternative contemplated embodiment, the cup 12 and the ring 14 may be made from different materials without departing from the scope of the present invention.

The ring 26 is essentially a flat, circular structure that presents, inter alia, a seating surface 30 for the lip 24 on the cap 12. The wall 28 is frusto-conically shaped to mate with the interior surface of the cap 12. The walls 18 of the cap also are frusto-conically shaped. The walls 18, 28 are frusto-conically shaped to provide better releasablility from a mold during the manufacture of the cap 12 and insert 14. The walls 18, 28 also are shaped to complement one another, thereby facilitating a connection between the cap 12 and the insert 14.

With respect to the insert 14, it is also noted that the surface 30 of the ring 26 presents a suitable surface for connecting the insert 14 to the cap 12 via any suitable attachment. For example, the cap 12 may be ultrasonically welded to the ring 26. Alternatively, the cap 12 may be connected to the ring 26 via an adhesive. Still further, friction welding may be employed. Other connection means also are contemplated to fall within the scope of the present invention. As should be apparent, the complimentary construction of the walls 18, 28 facilitates a connection between the cap 12 and the insert 14. As also should be apparent, the walls 18, 28 may be bonded to one another ultrasonically, via an adhesive, or via any other alternative means.

A plurality of castellations 32 extend from below the ring 26. The castellations 32 are provided so that the ring 26 does not come into contact with the surface 34 on which the nut 16 sits. As discussed in greater detail below, the castellations 32 establish a purposeful gap 50 between the ring 26 and the surface 34. This permits sealant 36 (see FIG. 14) to flow within the interior of the cap 12 and insert 14 and fill the spatial volume defined therein, thereby facilitating adequate coverage of the nut 16 with the sealant 36.

In an alternative contemplated embodiment, the castellations 32 may be formed as a part of the cap 12 and extend through holes in the insert 14. As should be apparent, the castellations 32 need not be part of the insert 14 in order to practice the present invention.

It is noted that the first embodiment of the lightning strike protector 10 includes five castellations 32. As should be understood, a larger or fewer number of castellations 32 may be employed without departing from the scope of the present invention. Moreover, the castellations 32 may have any suitable shape, size or thickness without departing from the scope of the present invention. For example, without limitation of the present invention, a minimum of two castellations 32 may be provided that extend around nearly the entire periphery of the ring 26.

A plurality of protrusions 38 extend toward the center of the insert 14 from an interior surface of the wall 28. The protrusions 38 are contemplated to be flexible. The protrusions 38 extend a sufficient distance toward the center 40 of the insert 14 so that the protrusions 38 engage an exterior surface of the nut 16, thereby securing the lightning strike protector 10 in a fixed orientation with respect to the nut 16. For reference, a central axis 42 of the lightning strike protector 10 also is illustrated.

As should be apparent, the protrusions 38 also are provided to lock the lightning strike protector 10 in relation to the nut 16. In addition, the protrusions 38 also are contemplated to assist with locking the nut 16 so that the nut 16 does not become loose or dislodged during operation of the aircraft.

In one or more embodiments of the present invention, it is noted that the lightning strike protector 10 is contemplated to include a minimum of three protrusions 38. When the protrusions 38 are designed as finger-shaped or tab-shaped structures (among other shapes), three is considered to be the minimum number of protrusions 38 that are needed to center the insert 14 and the cap 12 around the nut 16. As should be apparent, a larger number of protrusions 38 may be employed without departing from the scope of the present invention. Moreover, as discussed in connection with FIGS. 15 and 16, one or two protrusions may be employed in instances where the protrusions include one or more fixation elements, such as arms and/or a ring.

The nut 16 includes a hexagonal upper portion 44 and a cylindrical lower portion 46. The shape of the nut 16, however, may be of any variety without departing from the scope of the present invention. The shape of the nut 16 presented in the figures is intended to be representative of one possible configuration that may be employed in the construction of an aircraft. A central bore 48 is shown for the nut 16. The central bore 48 is contemplated to engage a bolt (not shown) via a suitable engagement, such as a threaded engagement. As should be apparent, any suitable engagement between the bolt and the nut 16 may be employed. The exact engagement is not a part of (nor critical to) the scope of the present invention.

Figure 2:
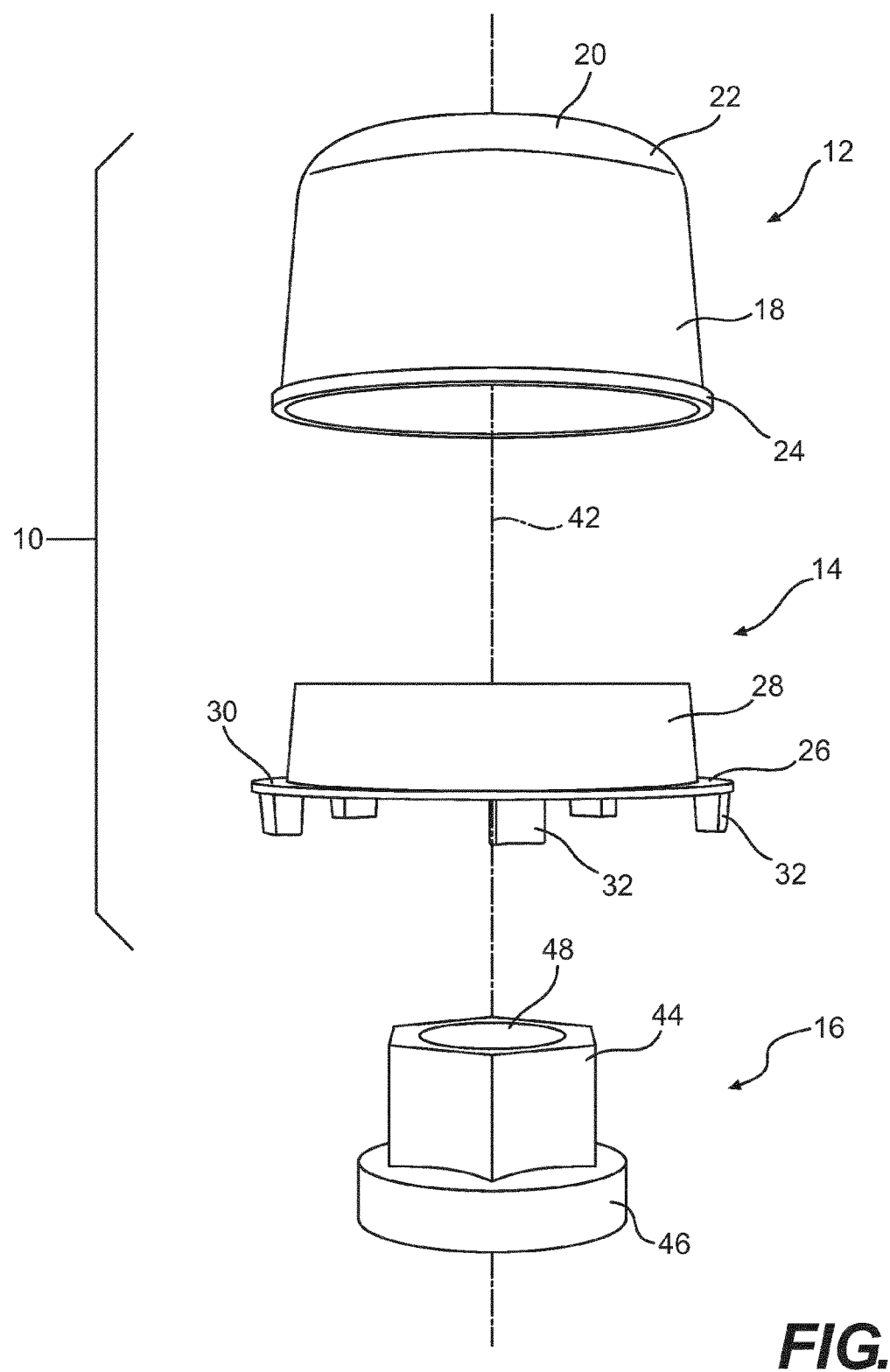
FIG. 2 is an exploded, side view of the embodiment of the lightning strike protector illustrated in FIG. 1.

FIG. 2 is a side view of the lightning strike protector 10 that is shown in FIG. 1. FIG. 2 is an exploded view to facilitate an understanding of the various components of the present invention.

Figure 3:
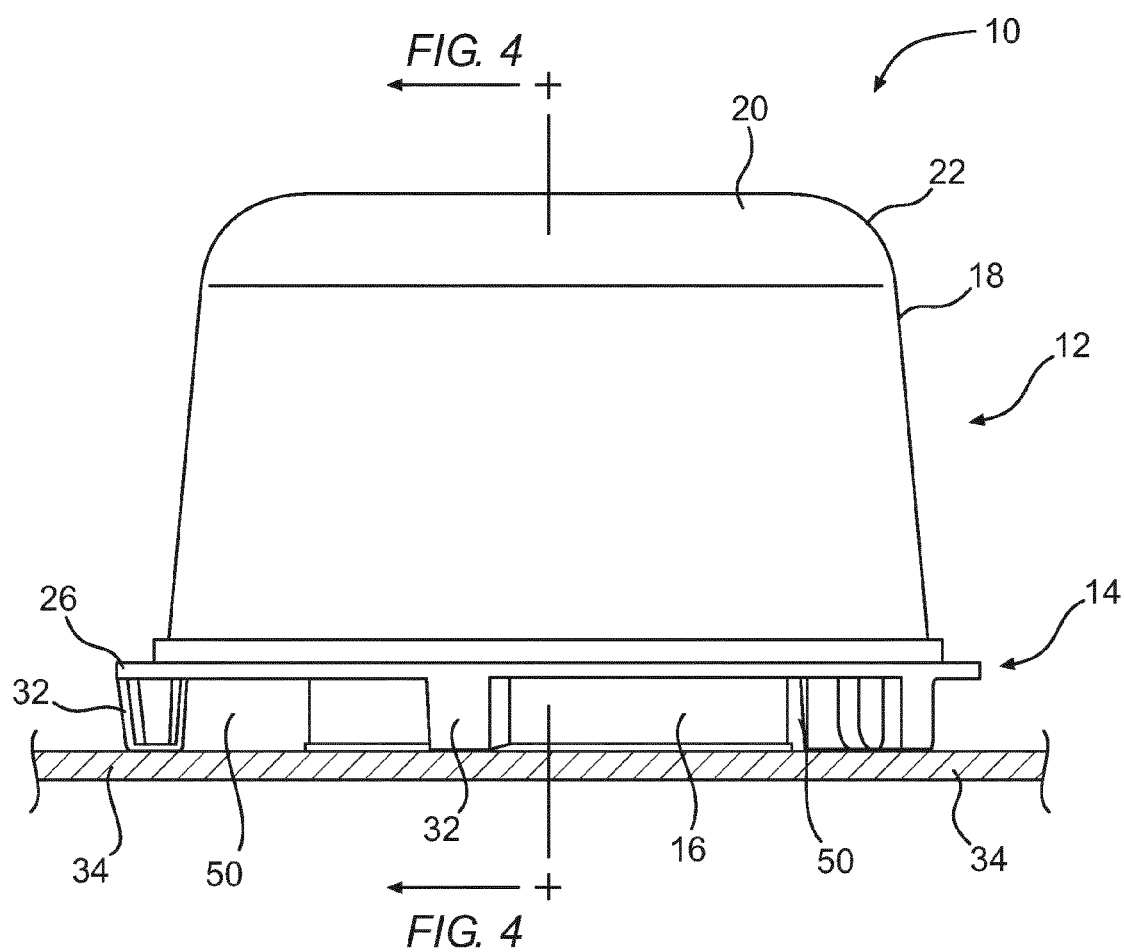
FIG. 3 is a side view of the lighting strike protector shown in FIG. 1, with the components depicted in an assembled condition.

FIG. 3 is a side view of the lightning strike protector 10, shown in an assembled condition. The cap 12 and the insert 14 are contemplated to engage one another via an interference fit. It is noted, however, that the cap 12 may be secured to the insert 14 via any suitable means. For example, the cap 12 may be secured to the insert 14 via an adhesive. Alternatively, the cap 12 may be bonded to the insert via ultrasonic welding or friction welding. Still further, the cap 12 and the insert 14 may be provided with ridges that engage one another, thereby discouraging the cap 12 from dislodging from the insert 14. In yet another contemplated embodiment, the cap 12 may threadedly engage the insert 14. As should be apparent, there are numerous ways in which the cap 12 may engage the insert 14. The present invention is not intended to be limited to any particular engagement between the cap 12 and the insert 14.

In an alternative construction, it is contemplated that the cap 12 and the insert 14 may be integrally formed as a single piece component. As should be apparent, it is also contemplated that the cap 12 and insert 14 may be made from three or more components without departing from the scope of the present invention.

Concerning the manufacture of the cap 12 and the insert 14, it is contemplated that any of a number of manufacturing techniques may be employed therefor. It is contemplated, for example, that the cap 12 and insert 14 may be manufactured using a layer manufacturing process (i.e., a three dimensional printing technique), a vacuum forming process, a punching process, a thermoforming process, and an injection molding process. It is also contemplated that the cap 12 and insert 14 may be machined from a block (or blocks) of material by traditional machining techniques including, but not limited to, water jet machining. As should be apparent, the cap 12 and insert 14 may be manufactured using any of a number of different methodologies without departing from the scope of the present invention.

With continued reference to FIG. 3, the gap 50 established between the ring 26 and the surface 34 by the castellations 32 is more clearly defined. As noted, the gap 50 permits the sealant 36 that is provided within the lightning strike protector 10 to flow around the nut 16 and fill the interior void defined by the cap 12 and the insert 14. While relatively large gaps 50 are illustrated in FIG. 3 and also in the remaining drawings, it is noted that the gaps 50 may have any size, as required or as desired, without departing from the scope of the present invention. Further details concerning this aspect of the invention are provided in connection with the discussion of FIG. 14, below.

Figure 4:
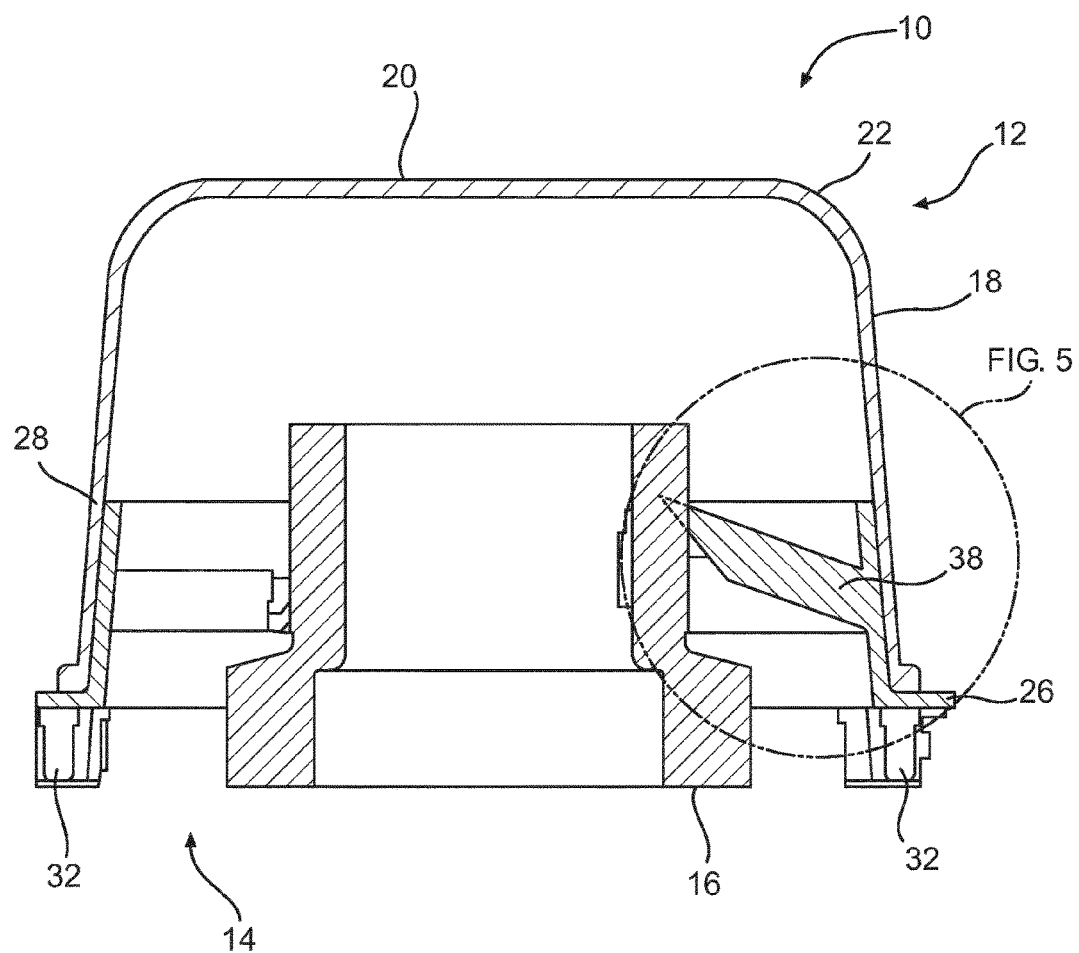
FIG. 4 is a cross-sectional side view of the lightning strike protector illustrated in FIG. 3.

FIG. 4 is a cross-sectional, side view of the lightning strike protector 10 illustrated in FIG. 3. The cross-section is taken along the line 4-4 that is illustrated in FIG. 3.

Figure 5:
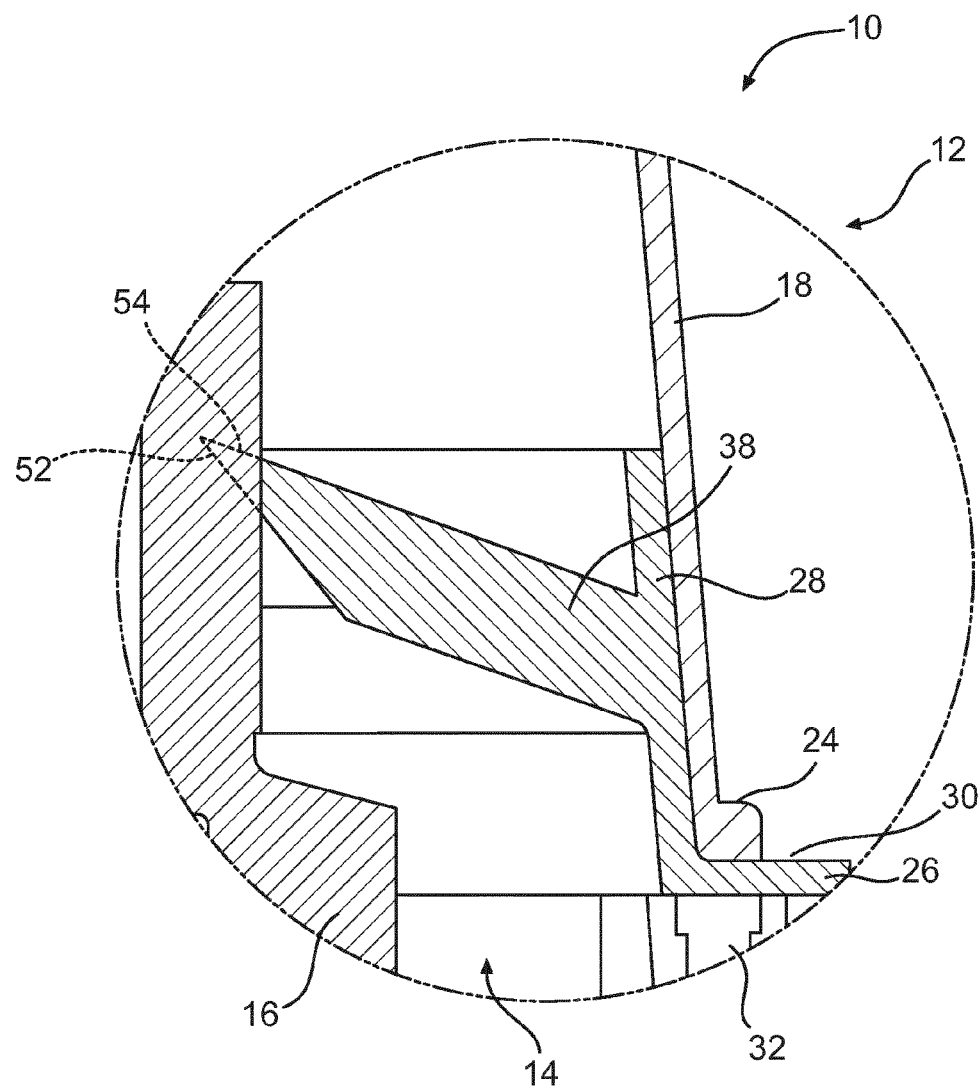
FIG. 5 is an enlarged detail of selected interior features of the lightning strike protector illustrated in FIG. 4.

FIG. 5 is a cross-sectional side view of a portion of the lightning strike protector 10 that is identified by the circle 5 in FIG. 4. This enlarged view provides a more complete illustration of the interference engagement between one of the protrusions 38 and the nut 16. It is noted that the finger-like protrusions 38 are contemplated to engage the surface of the nut 16 via an interference fit. However, to provide enhanced securement between the nut 16 and the protrusions 38, it is contemplated that the nut 16 may include a groove 52 into which a tip 54 of the protrusions 38 rests after the lightning strike protector 10 is fitted over the nut 16. As should be apparent to those skilled in the art, other enhanced engagement features may be provided without departing from the scope of the present invention.

Figure 6:
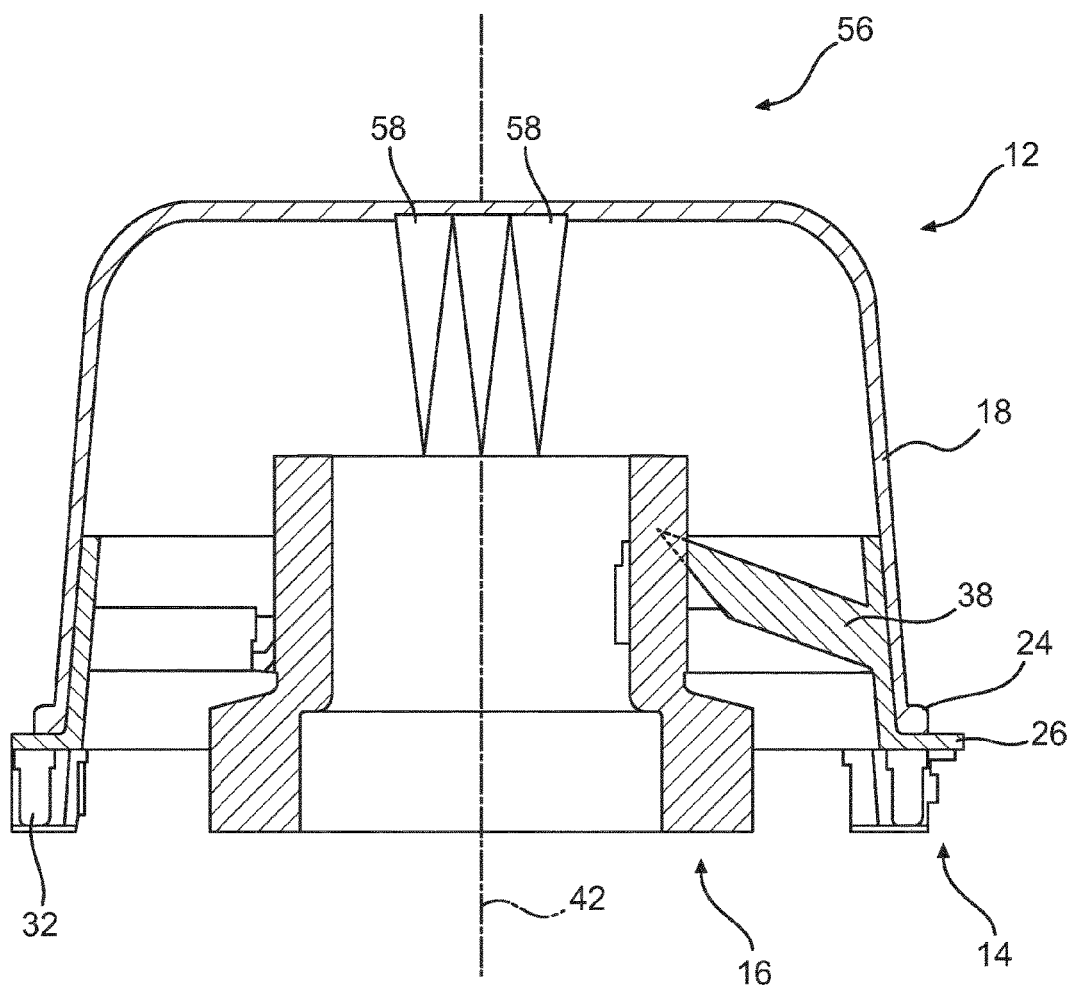
FIG. 6 is a cross-sectional side view of a second embodiment of a lightning strike protector according to the present invention.

FIG. 6 is a cross-sectional side view of a lightning strike protector 56 according to a second contemplated embodiment of the present invention. The lightning strike protector 56 is the same as the lightning strike protector 10 illustrated above in most respects. The lightning strike protector 56, however, includes one or more twist discouraging tabs 58 within the cap 12. Specifically, the twist discouraging tabs 58 extend downwardly from the interior surface of the cap 12, at locations proximate to the central axis 42. The twist discouraging tabs 58 are provided to extend into the space above the nut 16 so that, when the sealant 36 cures, the twist discouraging tabs 58 will become encased in the cured resin 36. Once the sealant cures, the twist discouraging tabs 58, which are connected to the cap 12, will discourage the cap 12 from rotating with respect to the cured (i.e., solidified) sealant 36. In this manner, the cap 12 is maintained in a fixed relationship to the cured sealant 36. While three twist discouraging tabs 58 are illustrated, a larger or a fewer number may be employed without departing from the scope of the present invention. In addition, while the twist discouraging tabs 58 are shown as extending to the top of the nut 16, this configuration is not required to practice the present invention. To the contrary, it is contemplated that the twist discouraging tabs 58 will not extend to a position less than 0.1 inches (2.54 mm) near to the nut 16. By maintaining a distance between the twist discouraging tabs 58 and the nut 16, the present invention eliminates a possible avenue for a spark to bridge the distance between the nut 16 and the twist discouraging tabs 58.

Figure 7:
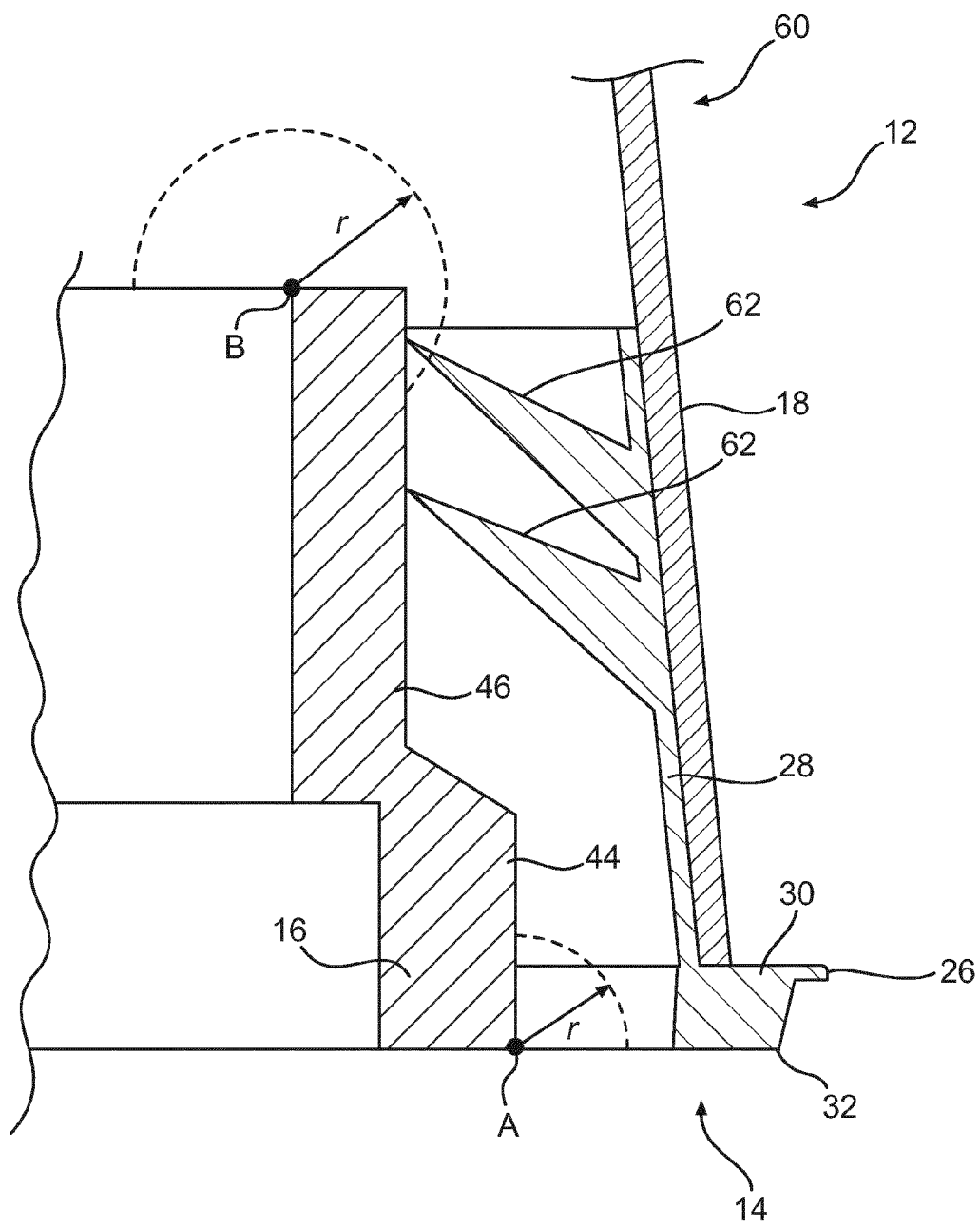
FIG. 7 is an enlarged, cross-sectional side view of a third embodiment of a lightning strike protector according to the present invention.

FIG. 7 is a partial, cross-sectional side view of a third embodiment of the lightning strike protector 60 according to the present invention. This embodiment is intended to incorporate the same features as discussed in connection with the lightning strike protector 10. In this embodiment, a plurality of stacked protrusions 62 extending inwardly from the wall 28 forming part of the insert 14. Additional protrusions 62 are contemplated to provide improved securement of the lightning strike protector 62 and the nut 16. As before, the protrusions 62 engage the top portion 46 of the nut.

It is noted that the shape of the protrusions 62 differs from the shape of the protrusions 38 that are discussed in connection with the lightning strike protector 10. As should be apparent to those skilled in the art, the exact shape of the protrusions 38, 62 is not critical to the construction and operation of the present invention. It is contemplated, however, that the protrusions 38, 62 will be shaped so as not to impede flow of the sealant 36 within the lightning strike protector 10.

Figure 8:
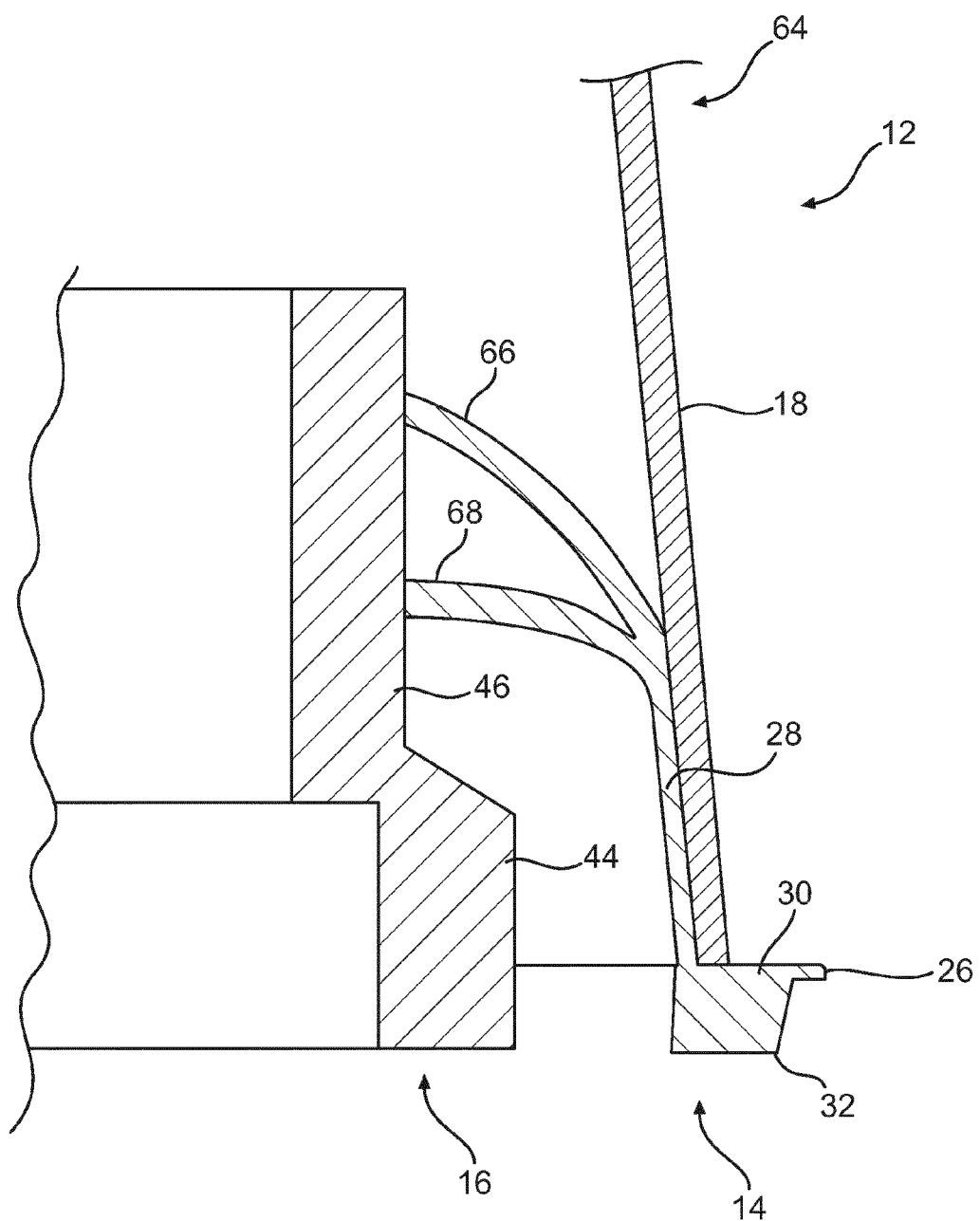
FIG. 8 is an enlarged, cross-sectional side view of a fourth embodiment of a lightning strike protector according to the present invention.

FIG. 8 is a partial, cross-sectional side view of a fourth embodiment of the lightning strike protector 64 according to the present invention. As before, this embodiment is contemplated to be similar to the lightning strike protector 10 discussed above. In this embodiment, however, a plurality of curved protrusions 66, 68 extend inwardly from the top end of the wall 28 to engage the nut 16.

Figure 9:
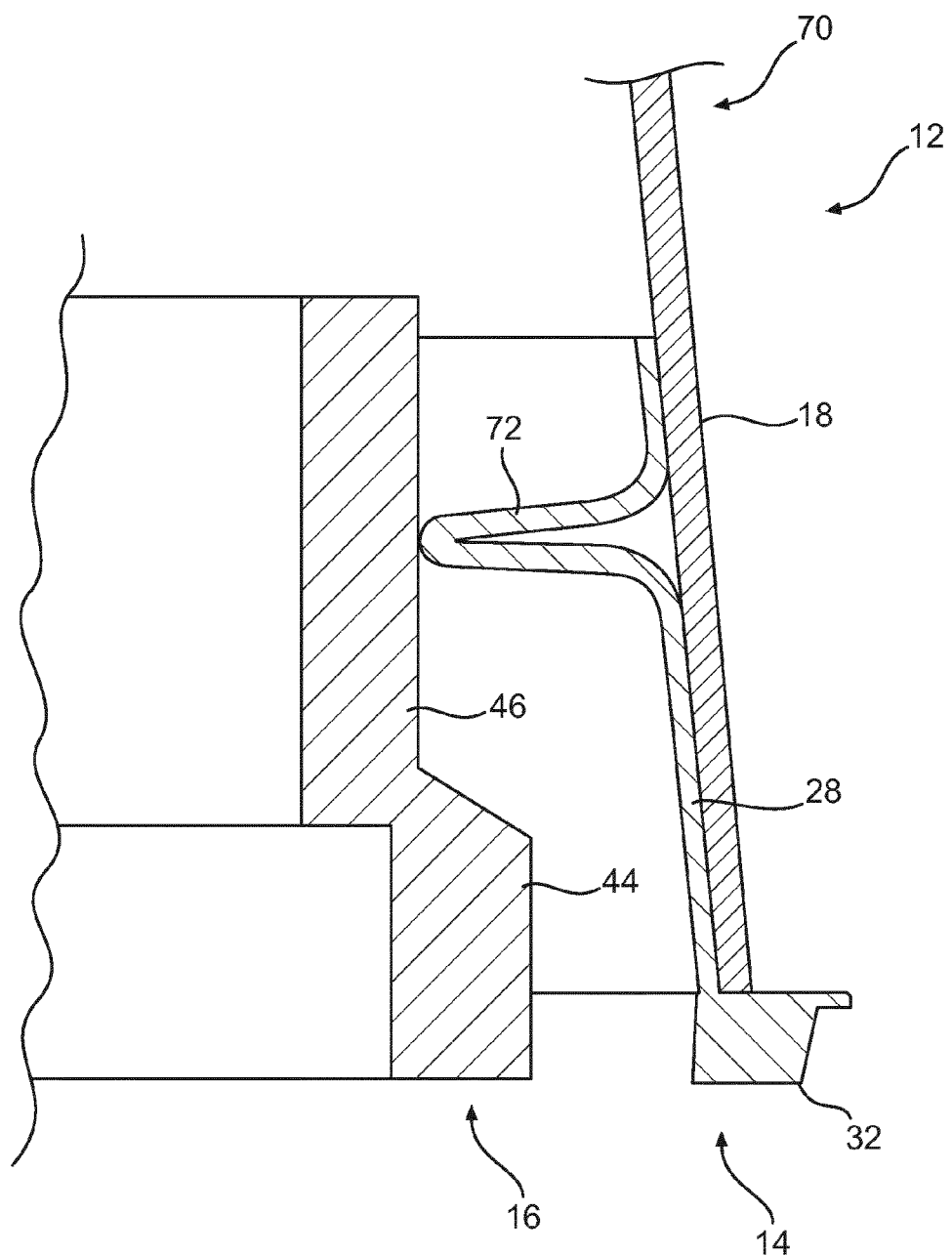
FIG. 9 is an enlarged, cross-sectional side view of a fifth embodiment of a lightning strike protector according to the present invention.

FIG. 9 is a partial, cross-sectional side view of a fifth embodiment of the lightning strike protector 70 according to the present invention. This embodiment also incorporates many of the features discussed in connection with the lightning strike protector 10. In this embodiment, however, the protrusions 38 are replaced by a protrusion 72, which may be formed as a crimped section of the wall 28. While not illustrated, it is contemplated that the wall 18 of the cap 12 also may be crimped to establish a further connection between the cap 12 and the insert 14. In still another contemplated embodiment, only the cap 12 may be crimped to establish a connection between the cap 12 and the insert 14.

Figure 10:
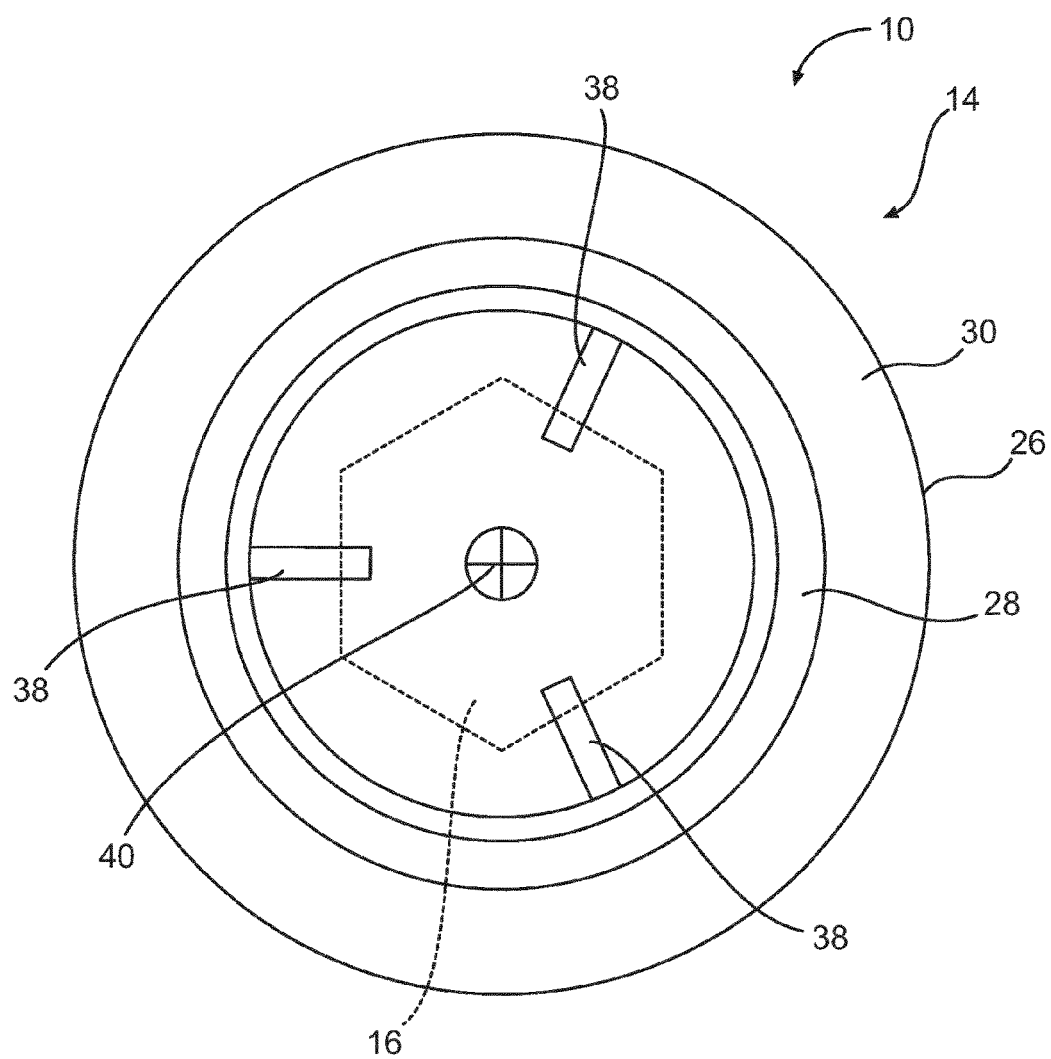
FIG. 10 is a top view of the insert portion of the lightning strike protector illustrated in FIG. 1.

FIG. 10 is a top view of the lightning strike protector 10, illustrating the relative positioning of the protrusions 38 with respect to one another. To facilitate an understanding of the invention, the cap 12 is not included in this view but has been removed. It is noted that the three protrusions 38 are equidistantly spaced from one another. As a result, the protrusions 38 are approximately 120° from one another. It is contemplated that, however, that the protrusions 38 need not be evenly spaced from one another to practice the present invention.

Figure 11:
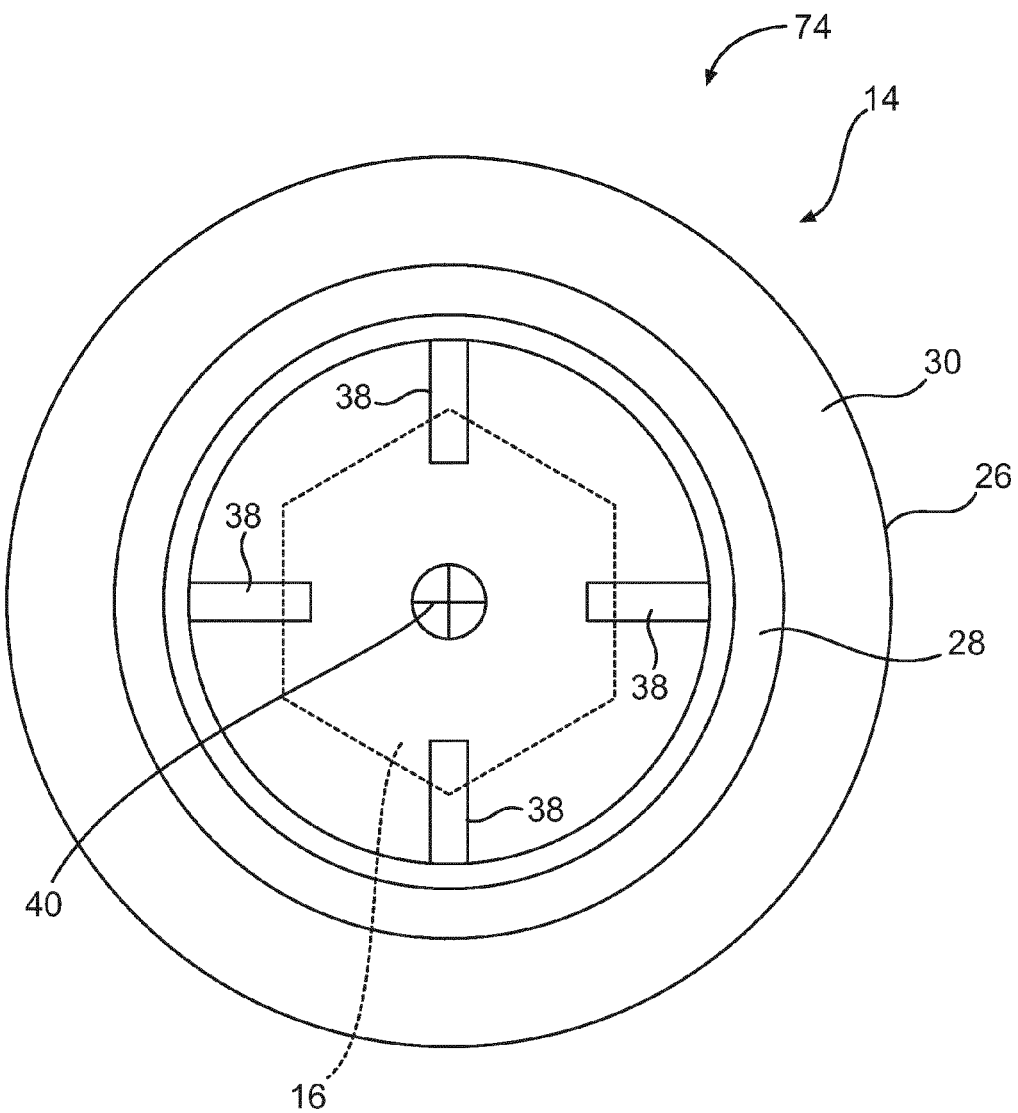
FIG. 11 is a top view of a sixth embodiment of a lightning strike protector according to the present invention, specifically the insert portion thereof.

FIG. 11 is a top view of a sixth embodiment of the lightning strike protector 74 according to the present invention. As with FIG. 10, this illustration does not include the cap 12. In this embodiment, the lightning strike protector includes four (4) protrusions 38, disposed approximately 90° from one another.

Figure 12:
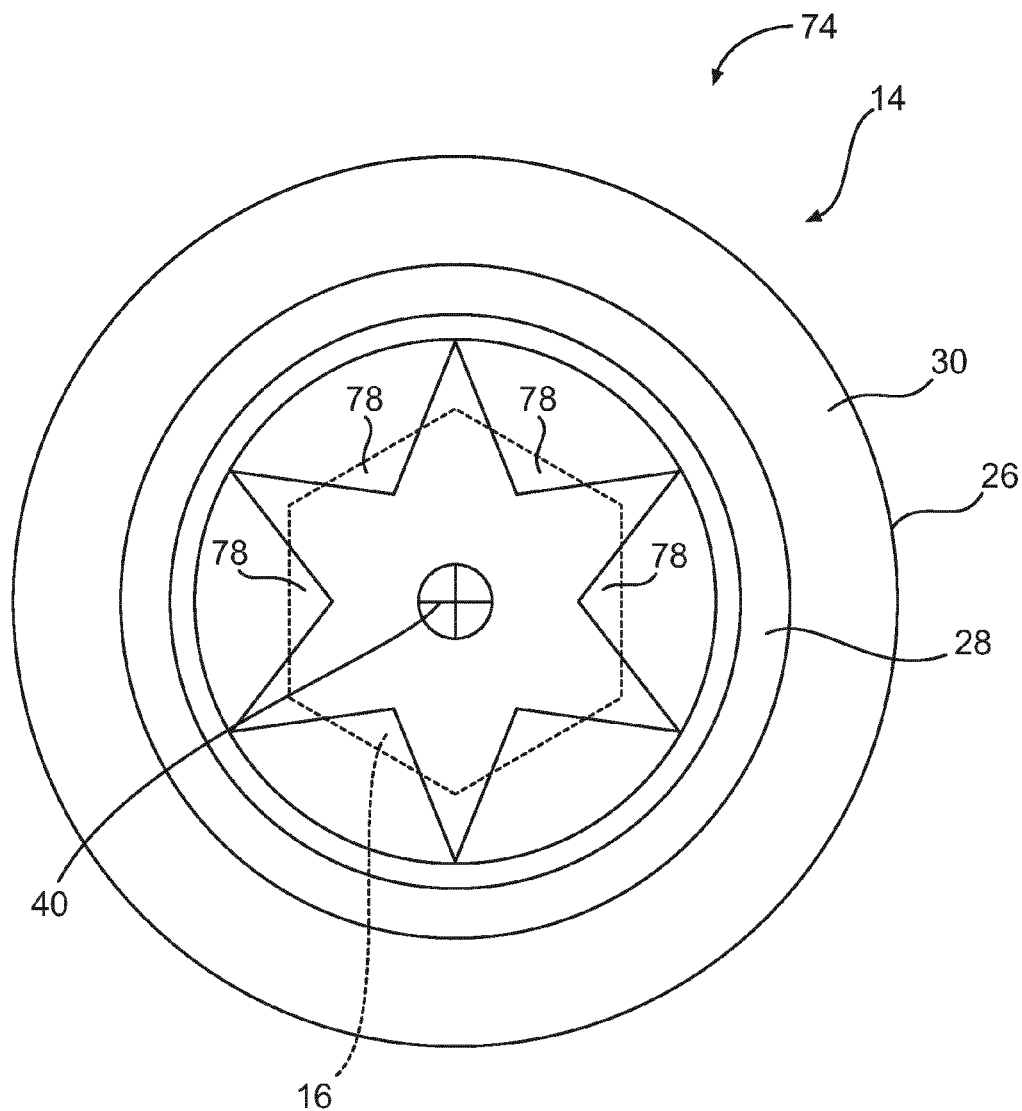
FIG. 12 is a top view of a seventh embodiment of a lightning strike protector according to the present invention, specifically the insert portion thereof.

FIG. 12 is a top view of a seventh embodiment of the lightning strike protector 76 according to the present invention. This embodiment includes six protrusions 78 that are triangularly shaped. This embodiment illustrates that the shape of the protrusions 78 is not critical to the construction and operation of the present invention. In other words, the protrusions 78 may have any of a number of different shapes while remaining within the scope of the present invention.

Figure 13:
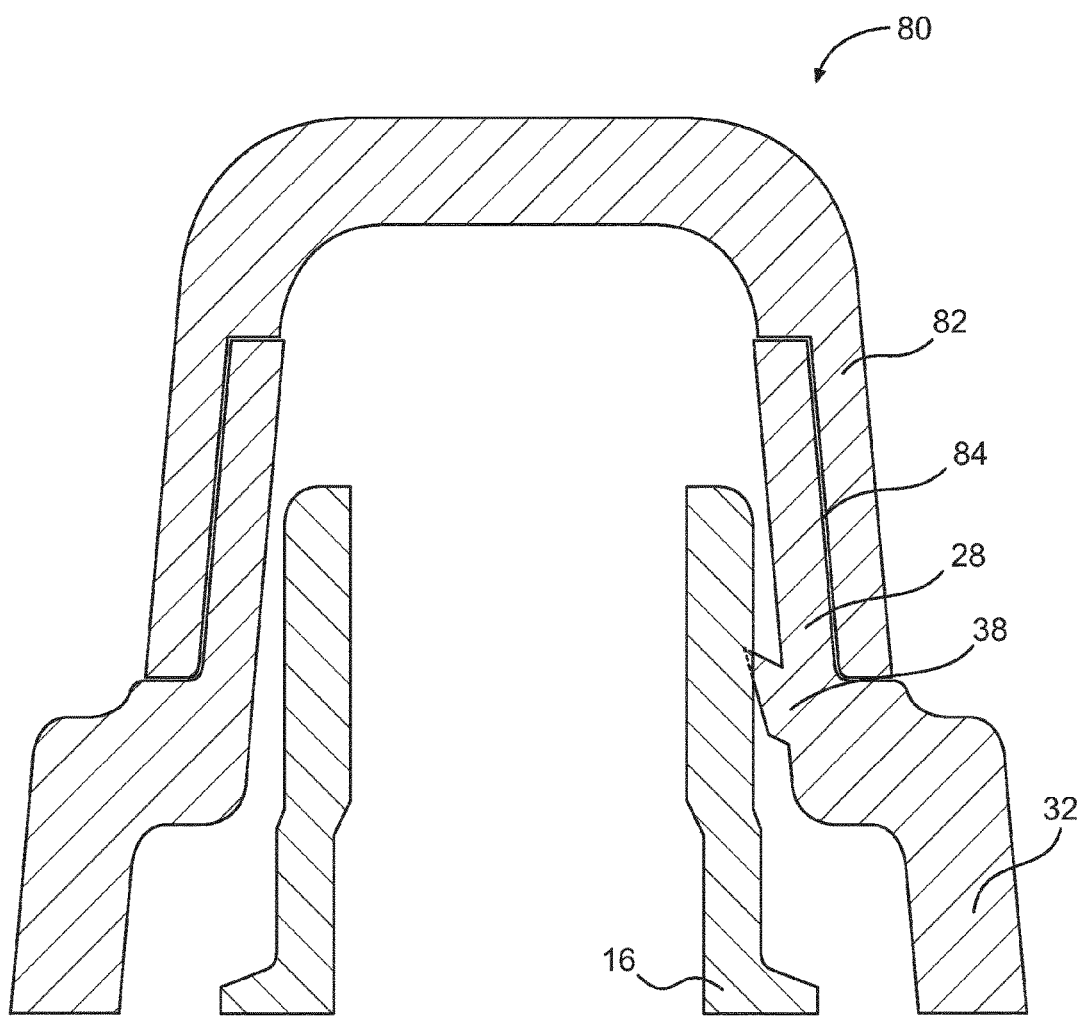
FIG. 13 is a cross-sectional, side view of an eighth embodiment of a lightning strike protector according to the present invention.

FIG. 13 is a graphical illustration of a cross-sectional side view of an eighth embodiment of the lightning strike protector 80 according to the present invention. In this embodiment, the cap 82 includes a recess 84 that accommodates the wall 28 therein. In addition, the castellations 32 are illustrated as being taller than the castellations 32 shown in the embodiment illustrated in FIG. 1.

With respect to the various embodiments described herein, it is noted that the protrusions 38 and the castellations 32 may be aligned radially with one another. Alternatively, the protrusions 38 and the castellations 32 may not be aligned radially. Still further, some of the protrusions 38 and castellations 32 may be aligned, while others are not. It is contemplated that the radial alignment or misalignment of the protrusions and castellations will depend upon a number of variables including, but not limited to, the flow of the sealant 36 within the cap 12 and around the protrusions 38. The locations shapes, and number of the protrusions 38 and the castellations 32 is contemplated to affect the flow of the sealant 36 within the cap 12, which may have a bearing on the placement of the protrusion 38 and castellations 32.

Figure 14:
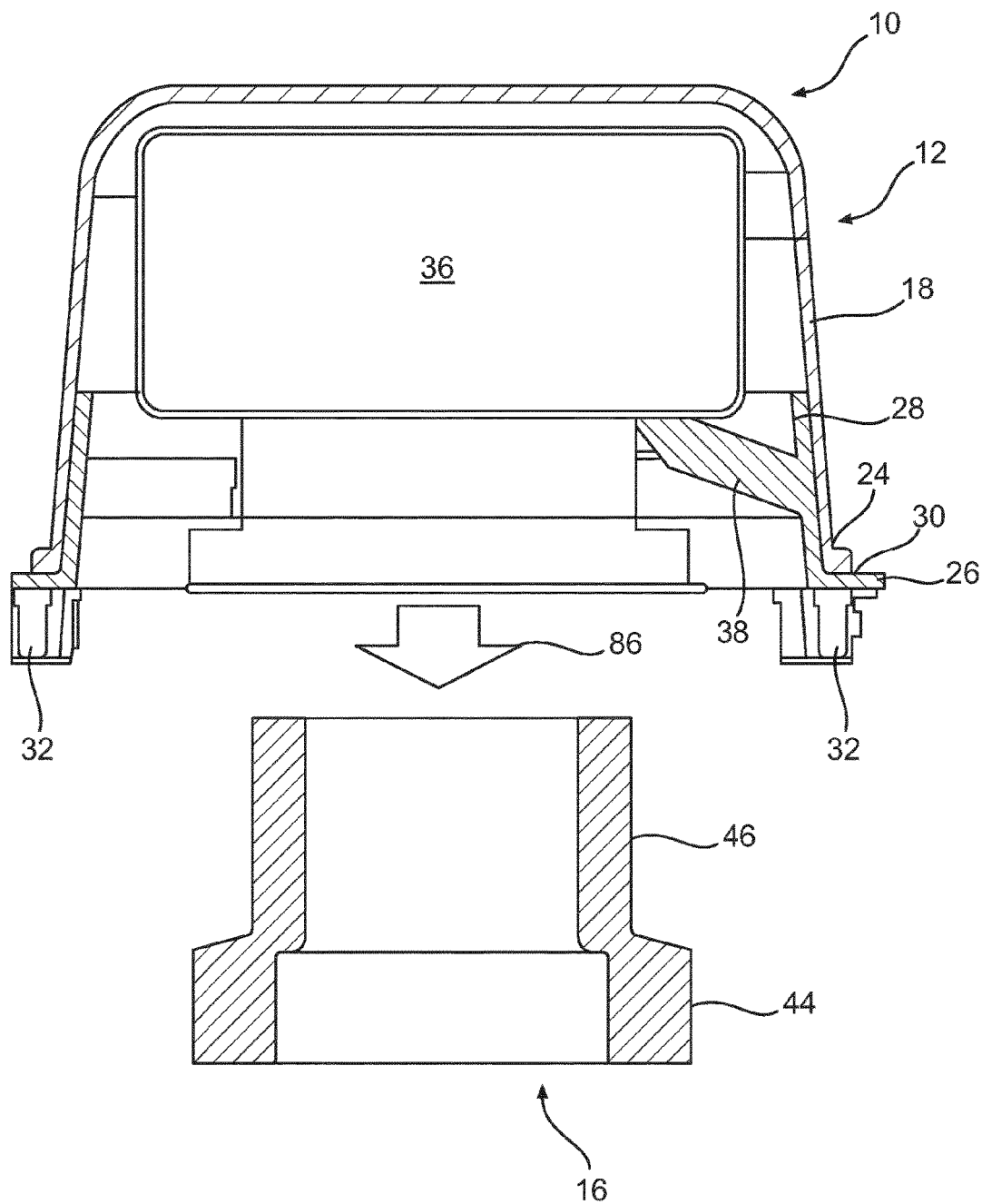
FIG. 14 is a cross-sectional side view of the first embodiment of the lightning strike protector of the present invention, illustrating a contemplated method of use thereof.

FIG. 14 is a cross-sectional side view of the lightning strike protector 10 that is shown in FIG. 1. In this view, the lightning strike protector 10 is illustrated in a position separate and apart from the nut 16. In addition, the cap 12 is shown as having been partially filled with the sealant 36.

FIG. 14 will now be used to discuss one way in which the lightning strike protector 10 is fitted over the nut 16. This illustration also assists with a discussion of one or more aspects of the present invention.

The composition of the sealant 36 that is used as a protective coating on bolts in the fuel tanks on aircraft is not critical to the construction or operation of the present invention. As should be apparent to those skilled in the art, the sealant 36 is understood to exhibit one or more of the following properties. First, the sealant is understood to begin in a fluid (or liquid) state where the sealant has the consistency of a silicone caulk, for example. The sealant cures (or hardens) to create a solid mass. Second, the sealant possesses a sufficiently high dielectric property to resist transitioning into a plasma when exposed to the energy from a lightning strike on the aircraft. Third, the sealant is contemplated to remain in the aircraft's fuel tank for an extended period of time (i.e., the lifetime of the fuel tank). As such, the sealant resists degradation from the fuel and also resists the formation of cracks and other defects over time.

One further consideration for the cap 12 and the insert 14 concerns their ability to resist degradation in response to environmental conditions. For example, it may be prudent to add an ultraviolet ("UV") stabilizer (or a UV coating) to the cap 12 and/or the insert 14 to protect against UV degradation. Still further, it may be advisable to add other stabilizers (and/or coatings) to increase the longevity and stability of the cap 12 and/or the insert 14 over an extended period of time, possibly for the operational lifetime of the aircraft.

While the protector 10 of the present invention is discussed in connection with lighting strike protection and electricity protection, the present invention should not be understood to be limited thereto. The protector 10 of the present invention also may function to provide protection against weathering, such as from moisture (i.e., prevent oxidation and rusting of the components covered thereby). Still further, the protector 10 may be employed in a position where the nut 16 and bolt (not shown) are to be insulated from contact with fuel and other liquids. As such, it is contemplated that the protector 10 may be employed as a liquid barrier in addition to providing electrical insulation.

Taking into account various aviation guidelines, the sealant 36 typically is applied to nuts 16 and bolts so that the sealant has a thickness of 0.1 inches (2.54 mm) or more. This thickness is understood to be sufficient to provide lightning strike protection in the fuel tanks on board an aircraft.

The thickness of 0.1 inches (2.54 mm) is considered to be a minimum thickness for the sealant 36 at locations where the electrical spark may leak from the nut 16 or associated bolt. Spark leakage locations include, but are not limited to, the top of the nut 16, the connection seam between the nut 16 and associated bolt, and the contact point between the nut 16 and the surface 34. Where a washer (not shown) is disposed between the nut 16 and the surface 34, additional spark leakage locations include the contact point between the washer and the surface 34 and the contact point between the washer and the nut 16. The sealant 36 is contemplated to be provided with a thickness of at least 0.1 inches (2.54 mm) at each of these locations, when present.

With renewed reference to FIG. 7, it is noted that the thickness of the sealant 36 is contemplated to be at least 0.1 inches (2.54 mm) at the locations where spark leakage is contemplated to occur. As noted, this includes, but is not limited to, the contact point A between the nut 16 (i.e., the cylindrical lower portion 46) and the surface 34. This also includes the contact point B between the nut 16 (i.e., the hexagonal upper portion 44) and the bolt (not shown) that is contemplated to be disposed in the central bore 48. FIG. 7 illustrates radii r that are intended to illustrate the zone of minimum thickness for the sealant 36 around the contact points A, B. It is contemplated that, the thickness of the sealant 36 adjacent to a location where spark leakage is possible will not be less than 0.1 inches (2.54 mm).

While the 0.1 inch (2.54 mm) minimum is contemplated for the present invention, it is noted that sealants with a higher capacity to insulate against spark leakage may be employed. If so, the radius r around the contact points A, B (etc.) may be less than 0.1 inches (2.54 mm). In other words, a smaller radius r is contemplated to fall within the scope of the present invention.

In this regard, at least for the present invention, the radius r (which is also referred to as the minimum sealant thickness) is contemplated to fall within a range of 0.1 inches (2.54 mm)±50%. In an alternative embodiment, the minimum sealant thickness may be 0.1 inches (2.54 mm)+40%. In still another embodiment, the minimum sealant thickness may be 0.1 inches (2.54 mm)±30% without departing from the present invention. Minimum sealant thicknesses of 0.1 inches (2.54 mm)±20%, ±10%, and ±5% also are contemplated for the present invention.

Taking the minimum thickness of the sealant 36 into account, one aspect of the present invention concerns the distance of the protrusions 38 from the surface 34 (or the bottoms of the castellations 32. It is contemplated that the minimum distance from the protrusions 38 to the surface 34 is at least 0.1 inches (2.54 mm) to assure that the minimum thickness of the sealant 36 is deposited at the bottom of the nut 16, adjacent to the surface 34. Of course, as indicated above, a larger distance may be employed without departing from the scope of the present invention.

As also should be apparent to those skilled in the art, other considerations associated with the dimensions and structure of the protector 10 of the present invention concern the ability to manufacture the various components that comprise the protector 10. Since it is contemplated that the components of the protector 10 may be made from a material that is injection-molded (i.e., plastics), the dimensions and shapes of the parts of the protector 10 necessarily will be determined, at least in part, by geometries that are readily formed and released from a mold. As should be apparent, however, these variables are not considered to be limiting of the scope of the present invention.

Taking advantage of the flowable property of the uncured sealant 36, the lighting strike protector 10 of the present invention is contemplated first to be filled with a predetermined quantity of the sealant, as shown in FIG. 14. The lightning strike protector 10 is then positioned over the exposed nut 16, as indicated by the arrow 86.

As the lightning strike protector 10 is pressed onto the nut 16, the protrusions 38 grip onto the nut to hold the lightning strike protector 10 in the correct orientation. The protrusions 38 also ensure that the spacing around the nut 16 is substantially the same around the entire periphery of the nut 16.

When the lightning strike protector 10 is pressed onto the nut, the sealant 36 flows from the initial position proximate to the top end 20 of the cap 12 and proceeds to fill the remaining volume of the interior of the lightning strike protector 10 not occupied by the nut 16. In this manner, the sealant 36 fills the spatial volume defined between the lightning strike protector 10 and the nut 16.

When filled properly, the sealant 36 occupies the entire volume under the cap 12, the space in the gap 50, and the space beneath the ring 26 of the insert 14. In other words, the sealant 36 is contemplated to fill the gap 50 up to the interior wall defined by the castellations 32 under the ring 26. This assures that a proper amount of sealant 36 is employed. It is also contemplated that an excess of sealant 36 may be employed so that the sealant 36 occupies the gaps 50 between the castellations 32 without departing from the scope of the present invention.

During installation, if any sealant 36 oozes out from the gap 50, this suggests that the volume within the lightning strike protector 10 has not been properly filled with the sealant 36. In other words, if excessive sealant oozes out from the gap 50, this suggests the formation of an air bubble within the lightning strike protector 10.

In connection with the cap 12, and with an eye to providing an appropriate amount of sealant, it is contemplated that the cap 12 may include a marking on the interior surface that acts as a fill line. If the cap 12 is filled with sealant 36 to the line, it is understood that the sealant will occupy the entirety of the volume between the lightning strike protector 10 and the nut 16.

In a further contemplated embodiment, it is contemplated that the lightning strike protector 10 may be used for nuts 16 with different sizes and shapes. If so, a suitable fill line may be provided for each different shape or size of nut 16.

With respect to the use of the lightning strike protector 10 with nuts 16 of different sizes, the present invention may include several variants for the insert 14 to accommodate the different configurations of nuts 16. In this embodiment, a first insert 14 may be used for a first type of bolt 16 and a second insert 14 may be used for a second type of bolt 16. The cap 12 may be the same for both nuts 16. In this manner, the present invention offers an economy of manufacture: one cap 12 may be made for a large variety of nuts 16 and a plurality of different inserts 14 may be manufactured for the different types of nuts expected to be covered by the lightning strike protector 10 of the present invention.

Once the lightning strike protector 10 is placed onto the nut 16, the protrusions 38 hold the lightning strike protector 10 in place until the sealant 36 cures. Once cured, the sealant 36 and the protrusions 38 cooperate to discourage removal of the lightning strike protector 10 from the nut 16. Specifically, the cured sealant 36 reinforces the positions of the protrusions 38 and holds the protrusions 38 against the nut 16. In this manner, the sealant 36 helps the cap 12 and insert 14 remain attached to the bolt 16.

Separately, it is noted that the protrusions 38 also are anticipated to hold the cap 12 in place, should a failure develop between the sealant 36 and the cap 12. For example, during use, if an air gap should develop between the walls of the cap 12 and the sealant 36, the protrusions 38, which become locked in place when the sealant 36 cures, are contemplated to hold the lightning strike protector 10 in the proper orientation. As a result, the protrusions 38 act as a safety feature for the lighting strike protector 10.

It is also contemplated that the cap 12 may be filled with an amount of sealant 36 in excess of the amount needed to fill the void established between the lightning strike protector 10 and the nut 16. In this instance, the sealant 36 is permitted to ooze out of the gap 50. The installer may then remove the excess sealant 36 after installation but before the sealant 36 cures.

As noted above, when the lightning strike protector 10 is not properly installed, it is likely that some sealant 36 will ooze out from under the cap 12 through the gap 50. As a result, the gap 50 provides a visual indicator of a faulty installation. The gap 50 also provides a convenient way to remove excess sealant 36 for those installations where excess sealant 36 had been intentionally provided.

As should be apparent to those skilled in the art, it is often necessary to seal nuts 16 that hang downwardly from an overhead surface 34. Since the sealant 36 is flowable until it cures, the lightning strike protector 10 holds the sealant 36 in its inverted position until the sealant 36 cures.

With respect to the cap 12, it is contemplated in one embodiment, that the cap 12 may be made from a transparent or a translucent material. If so, a person may be able to visually determine if any air bubbles have developed in the sealant 36 inside of the lightning strike protector 10.

In another contemplated embodiment, it is contemplated that the cap 12 may include an abraded interior surface so that the sealant 36, when cured, will adhere more strongly to the interior of the cap 12, thereby enhancing the efficacy of the seal for an extended period of time. Alternatively, it is contemplated that the interior of the cap may be provided with a plurality of hair-like cilia, bumps, castellations, hollows, etc., on its interior surface to facilitate bonding between the sealant 36 and the cap 12. Separately, it is contemplated that the interior of the cap 12 may be machined, plasma treated, exposed to a corona discharge, or mechanically abraded to establish an interior surface that has a greater affinity for adhesion to the sealant 36.

Another embodiment of the present invention contemplates that the caps 12 may be color coded. In this embodiment, the color coding may indicate that the lightning strike protector 10 meets specific safety requirements. The color coding might also indicate other aspects such as the thickness of the sealant 36 under the cap 12, the type of nut 16 under the cap, etc.

Identifying indicia (i.e., a part number) may be molded into the surface of the cap 12, as required or as desired.

As noted above, the shape of the cap 12 and insert 14 are not considered to be critical to the operation of the lightning strike protector 10 of the present invention. However, to minimize the amount of sealant employed, it may be desirable to fashion the cap 12 and insert 14 so that the components compliment the shape of the bolt 16.

It is contemplated that the protrusions 38 will assist with protection of the nut 16 in the event of a lightning strike. Specifically, the protrusions 38 are contemplated to provide an extra gripping force to prevent the lightning strike protector 10 from blowing off of the nut 16 in the event of a lightning strike.

In yet another contemplated embodiment, the exterior surface of the cap 12 may be provided with a roughened, exterior surface to facilitate installation of the lightning strike protector 10. For example, the cap 12 may be provided with striations akin to the striations found on the cap of a toothpaste tube. If provided, the striations are expected to assist the installer to grip the lightning strike protector 10 during installation, thereby assuring a proper installation and fit. Separately, the striations (or similar external features) are contemplated to assist, should the placement of the lightning strike protector 10 be made via an automated process and/or device.

While not considered to be limiting of the present invention, it is contemplated that the cap 12 and insert may be made from a non-metallic material. Non-metallic materials include, but are not limited to, ceramics, plastics, thermoset plastics, polymers, etc. The non-metallic materials may include non-metallic fillers, such as glass fibers, for example. While it is contemplated that the material selected for the cap 12 and insert 14 will have dielectric properties similar to the sealant, this is not required for practice of the present invention. Specifically, the cap 12 and insert 14 may have a dielectric constant that is less than or greater than the sealant 36 without departing from the scope of the present invention.

It is noted that the cap 12 and insert 14 may be manufactured by any of a number of different techniques. Contemplated manufacturing methods include injection molding, thermoforming, vacuum forming, and additive layer manufacturing, among others.

While it is contemplated that the sealant 36 will be filled into the cap 12 immediately prior to installation, it is contemplated that the lightning strike protector 10 may be filled with sealant 10, frozen, and stored until required for use. In this embodiment, it is contemplated that an automated manufacturing method may be used to assure that each lightning strike protector 10 includes precisely the required amount of sealant 36, thereby avoiding waste (among other things).

While not considered to be limiting of the present invention, the sealant 36 may be polysulfide with or without additional ingredients and/or components.

Figure 15:
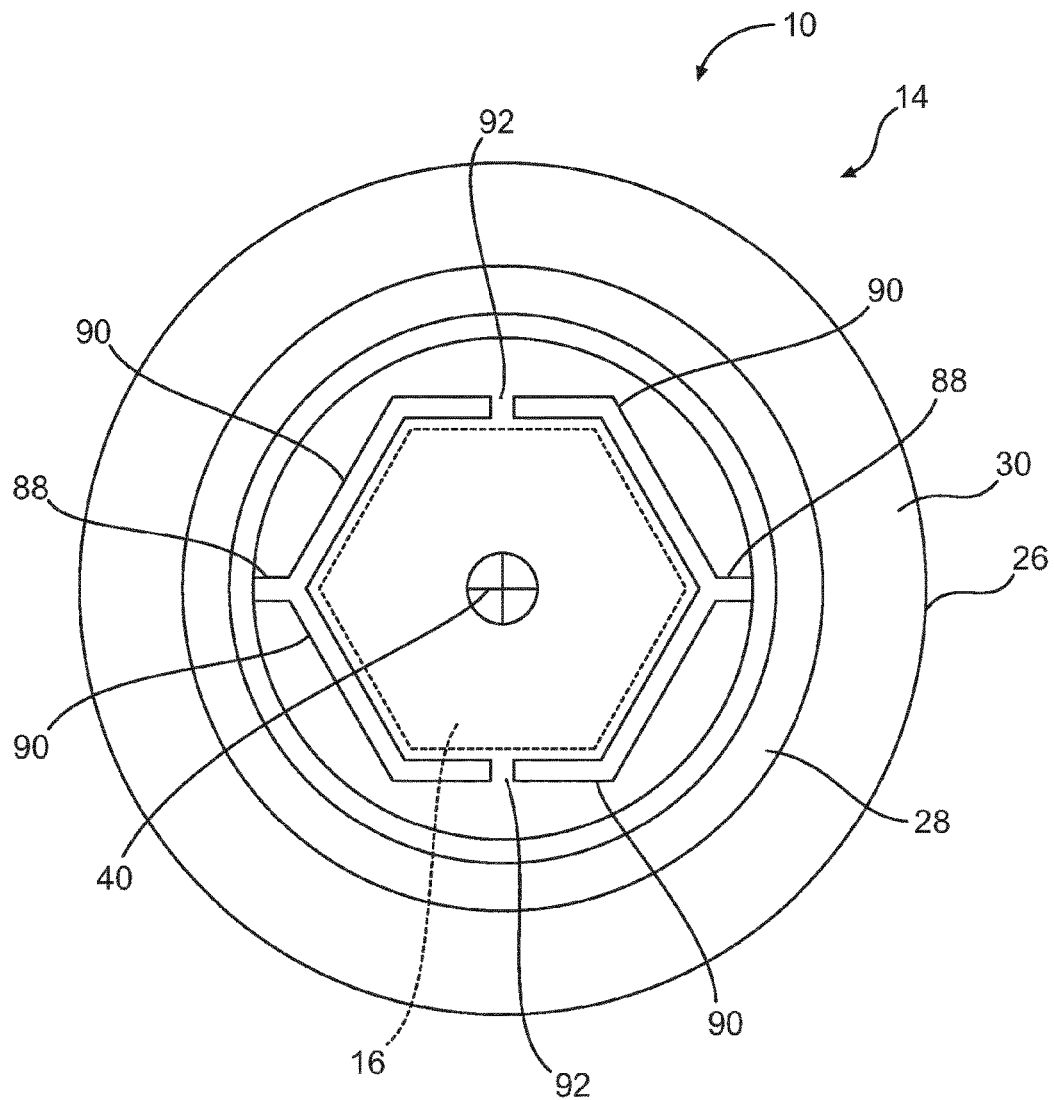
FIG. 15 is a top view of an eighth embodiment of a lightning strike protector according to the present invention, specifically the insert portion thereof.

FIG. 15 is a top view of a further contemplated embodiment of the present invention. In this top view, the insert 14 includes two protrusions 88. Each protrusion includes arms 90 that extend outwardly therefrom. As such, the protrusions 88 and arms 90 engage the nut 16 and discourage rotation with respect thereto. As illustrated, the arms 90 on the protrusions 88 are separated from one another by gaps 92. This embodiment contemplates that the lightning strike protector 10 need have only two protrusions 88 associated with the insert 14. As should be apparent, the configuration of the protrusions and the arms 90 is but one possible configuration when two protrusions 88 are employed.

Figure 16:
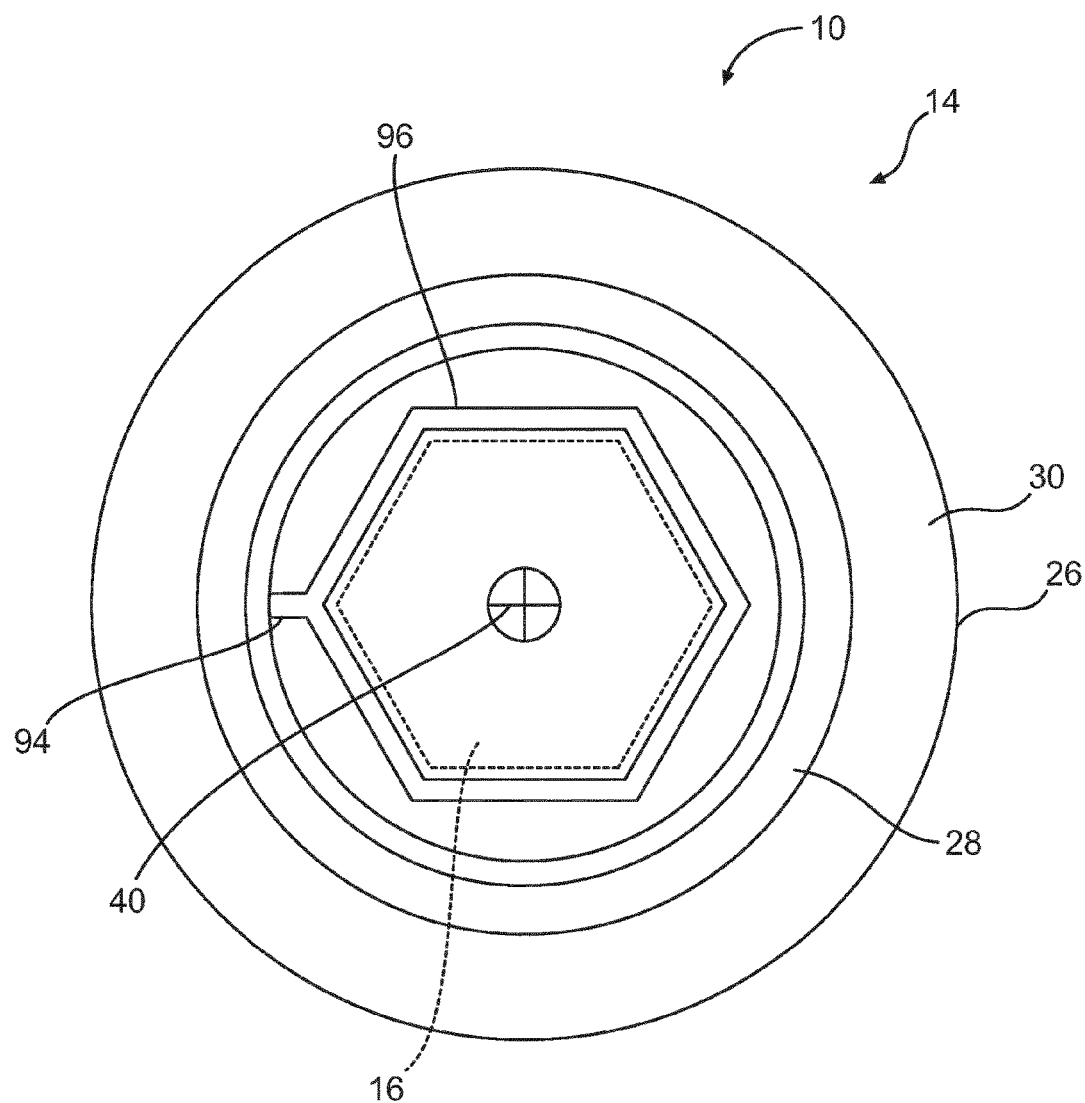
FIG. 16 is a top view of a ninth embodiment of a lightning strike protector according to the present invention, specifically the insert portion thereof.

FIG. 16 is a top view of a further embodiment of the lightning strike protector 10 of the present invention. Here, the insert 14 includes only one protrusion 94. The protrusion 94 include a ring 96 that encircles the nut 16, thereby providing engagement between the nut 16 and the insert 14. This embodiment illustrates that the present invention need only include one protrusion 94 for its operation. As should be apparent, the shape and size of the protrusion 94 and ring 96 is not critical to the present invention.

Figure 17:
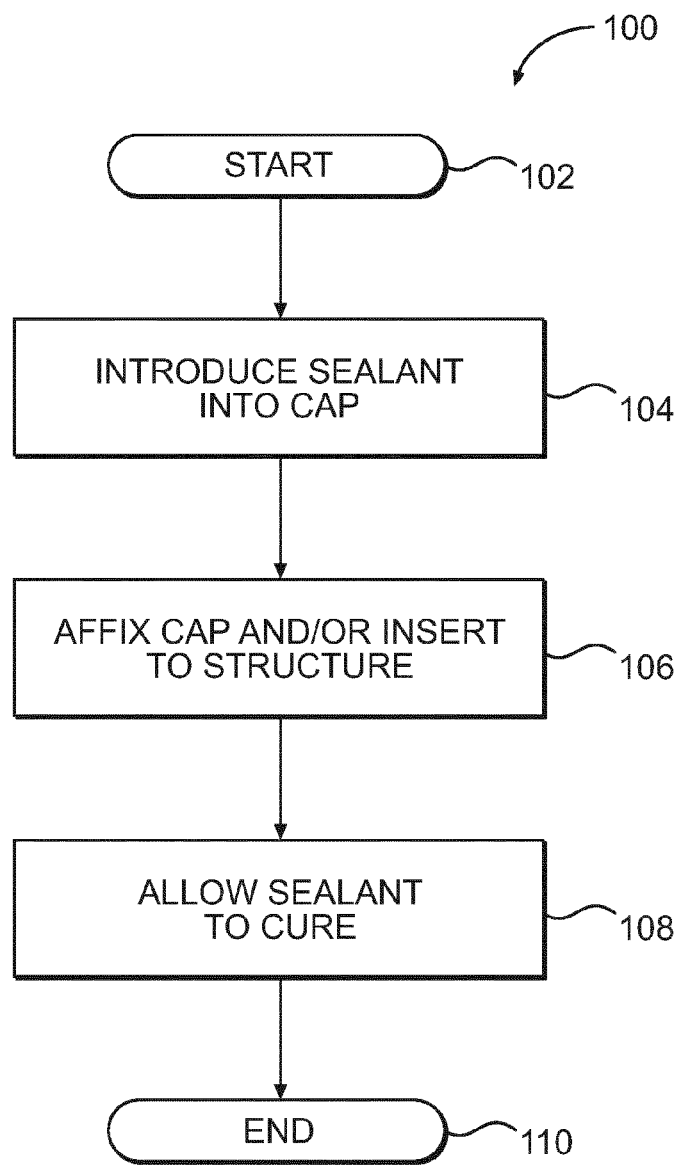
FIG. 17 is a graphical depiction of one contemplated method employable with the lightning strike protector of the present invention.

FIG. 17 is a flow chart that illustrates a method 100 associated with the operation of the present invention.

The method 100 begins at step 102. The method 100 proceeds to step 104 where the sealant 36 is introduced into the cap 12. From step 104, the method 100 proceeds to step 106 where the cap 12 is positioned over the structure, such as the nut 16. The method then proceeds to step 108, where the sealant 36 is permitted to cure. The method ends at step 110.

As should be apparent from the foregoing, when the steps 104-108 are performed in the order delineated in FIG. 17, the cap 12 is understood as having been pre-filled with the sealant 36 before the cap 12 is affixed to the nut 16. The insert 14 may or may not be affixed to the nut 16 prior to attachment of the cap 12.

It is also contemplated that the cap 12 and the insert 14 may be affixed to the nut 16 before the sealant is added. In this contemplated variation, step 104 follows step 106. In this contemplated variant, the sealant 36 may be injected into the lightning strike protector 10 after the cap 12 and insert 14 are placed on the nut 16.

As noted above, the present invention has been described in connection with several embodiments and variations. The present invention is not intended to be limited to any one particular embodiment or to any one particular feature described herein. To the contrary, there are numerous variations and equivalents that those skilled in the art would appreciate in connection with the present invention. Those variations and equivalents are intended to be encompassed by the present invention.

What is claimed is:

1. An electrical protector with a central axis, comprising:
   a cap defining a top and a downwardly extending cap wall adapted for receiving a sealant;
   an insert defining a ring and an upwardly extending insert wall;
   a plurality of castellations for maintaining a gap between the ring and a surface on which the electrical protector sits; and
   at least one protrusion extending inwardly from an interior surface of the insert wall toward the central axis;
   wherein the cap wall connects to the insert wall, and
   wherein the at least one protrusion comprises a finger-like element adapted to engage a structure, thereby securing the electrical protector onto the structure.

2. The electrical protector of claim 1, wherein the cap wall is frusto-conically shaped.

3. The electrical protector of claim 1, wherein the insert wall is frusto-conically shaped.

4. The electrical protector of claim 1, wherein the sealant comprises polysulfide.

5. The electrical protector of claim 1, wherein the cap wall and the insert wall engage one another by an interference fit.

6. The electrical protector of claim 1, wherein the structure is at least one of a nut and a bolt.

7. The electrical protector of claim 6, wherein the structure is located inside of a fuel tank of an aircraft.

8. The electrical protector of claim 1, wherein the plurality of castellations extend from the ring of the insert.

9. The electrical protector of claim 1, wherein the plurality of castellations extend from the cap through openings in the ring.

10. The electrical protector of claim 1, wherein the protrusions comprise a plurality of protrusions.

11. The electrical protector of claim 10, wherein the plurality of protrusions are substantially evenly distributed around the interior surface of the insert wall.

12. The electrical protector of claim 8, wherein the plurality of castellations are substantially evenly distributed around the ring.

13. The electrical protector of claim 9, wherein the plurality of castellations are evenly substantially distributed around the cap.

14. The electrical protector of claim 1, wherein the cap and the insert integrally form a single structure.

15. The electrical protector of claim 1, wherein the cap and the insert are connected to one another via at least one of ultrasonic welding, friction welding, or an adhesive.

16. The electrical protector of claim 1, wherein the cap and the insert comprise at least one of a ceramic, a plastic, a thermoset plastic, or a polymers.

17. The electrical protector of claim 13, wherein the cap and insert comprise glass fibers.

18. The electrical protector of claim 1, wherein the cap, the insert, and the sealant have substantially equal dielectric properties.

19. The electrical protector of claim 1, wherein the cap, the insert, and the sealant have unequal dielectric properties.

20. The electrical protector of claim 1, further comprising at least one twist discouraging tab extending into the cap from a location proximate to a center point of the cap.

21. The electrical protector of claim 1, wherein the finger-like element is flexible and extends inwardly from the insert wall.

22. The electrical protector of claim 1, wherein the at least one protrusion comprises a triangularly-shaped element that extends inwardly from the insert wall.

23. The electrical protector of claim 1, wherein the at least one protrusion comprises a folded portion of the insert wall.

24. The electrical protector of claim 1, wherein the electrical protector protects against lightning strikes.

25. The electrical protector of claim 1, wherein the at least one protrusion comprises at least three protrusions.

26. A method for positioning an electrical protector over a structure to be protected, wherein the electrical protector has a central axis and comprises a cap defining a top and a downwardly extending cap wall adapted for receiving a sealant, an insert defining a ring and an upwardly extending insert wall, a plurality of castellations for maintaining a gap between the ring and a surface on which the electrical motor sits, and at least one protrusion extending inwardly from an interior surface of the insert wall toward the central axis, wherein the cap wall connects to the insert wall, and wherein the at least one protrusion comprises a finger-like element adapted to engage a structure, thereby securing the electrical protector onto the structure, the method comprising:
   introducing the sealant into the cap;
   affixing the cap and insert to the structure with the at least one protrusion in contact with the structure; and
   allowing the sealant to cure, thereby locking the at least one protrusion against the structure.

* * * * *